United States Patent [19]

Whitney et al.

[11] Patent Number: 4,749,008

[45] Date of Patent: Jun. 7, 1988

[54] METHODS AND APPARATUS FOR CONTAINER FILLING

[75] Inventors: Peter D. Whitney, Lowville; Donald J. Phoenix, Glenfield, both of N.Y.

[73] Assignee: Kraft, Inc., Glenview, Ill.

[21] Appl. No.: 924,745

[22] Filed: Oct. 30, 1986

[51] Int. Cl.⁴ .............................................. B65B 3/04
[52] U.S. Cl. ........................................ 141/1; 141/83; 141/103; 141/170; 141/248; 141/128
[58] Field of Search .................. 141/83, 128, 129–192, 141/82, 234–248, 1–12, 100–110

[56] References Cited

U.S. PATENT DOCUMENTS

| | | | |
|---|---|---|---|
| 632,284 | 9/1899 | Seward | 249/22 |
| 960,108 | 5/1910 | Richardson | 249/22 |
| 1,350,611 | 8/1920 | Kader | 249/42 |
| 1,603,274 | 10/1926 | Gammel | 249/42 |
| 1,648,077 | 11/1927 | Taylor | 249/22 |
| 2,227,640 | 1/1941 | Ferguson | 249/22 |
| 2,352,114 | 6/1944 | Muskat | 249/42 |
| 2,373,831 | 4/1945 | Howard | 249/42 |
| 2,491,056 | 12/1949 | Muskat | 249/19 |
| 2,592,083 | 4/1952 | Vigim | 249/42 |
| 2,815,920 | 12/1957 | Forman et al. | 249/18 |
| 2,931,614 | 4/1960 | Charcuset et al. | 249/64 |
| 3,095,055 | 6/1963 | McLaughlan | 177/53 |
| 3,209,845 | 10/1965 | de Hollander | 177/70 |
| 3,254,728 | 6/1966 | Aquadro et al. | 177/15 |
| 3,416,619 | 12/1968 | McClusky | 177/53 |
| 3,416,620 | 12/1968 | McClusky | 177/53 |
| 3,434,555 | 3/1969 | Wyatt | 177/52 |
| 3,474,874 | 10/1969 | Pettis | 177/50 |
| 3,557,889 | 1/1971 | Reusa | 177/1 |
| 3,589,458 | 6/1971 | Schwake | 177/122 |
| 3,620,317 | 11/1971 | Henry | 177/54 |
| 3,648,741 | 3/1972 | Croasdale et al. | 141/9 |
| 3,708,026 | 1/1973 | Senour | 177/60 |
| 3,720,286 | 3/1973 | Clark | 177/81 |
| 3,814,196 | 6/1974 | McClusky | 177/54 |
| 3,837,415 | 9/1974 | Connors et al. | 177/123 |
| 3,856,097 | 12/1974 | Bartlo et al. | 177/1 |
| 3,977,483 | 8/1976 | Greanias | 177/1 |
| 4,074,507 | 2/1978 | Ruf et al. | 53/59 |
| 4,129,189 | 12/1978 | Maglecic et al. | 177/123 |
| 4,211,263 | 7/1980 | Kennedy et al. | 141/83 |
| 4,225,001 | 9/1980 | Gillenkirch | 177/90 |
| 4,300,600 | 11/1981 | Tetenborg et al. | 141/10 |
| 4,308,928 | 1/1982 | Oshima | 177/25 |
| 4,494,582 | 1/1985 | Meyer | 141/83 |
| 4,494,619 | 1/1985 | Matsuno | 177/25 |
| 4,501,339 | 2/1985 | Fukuda | 177/25 |
| 4,508,185 | 4/1985 | Minamida et al. | 177/1 |
| 4,527,645 | 7/1985 | Sashiki et al. | 177/1 |
| 4,565,253 | 1/1986 | Berlebner et al. | 177/1 |

Primary Examiner—Houston S. Bell, Jr.
Attorney, Agent, or Firm—Fitch, Even, Tabin & Flannery

[57] ABSTRACT

Methods and apparatus for accurately packaging viscous food products within a predetermined weight range.

16 Claims, 17 Drawing Sheets

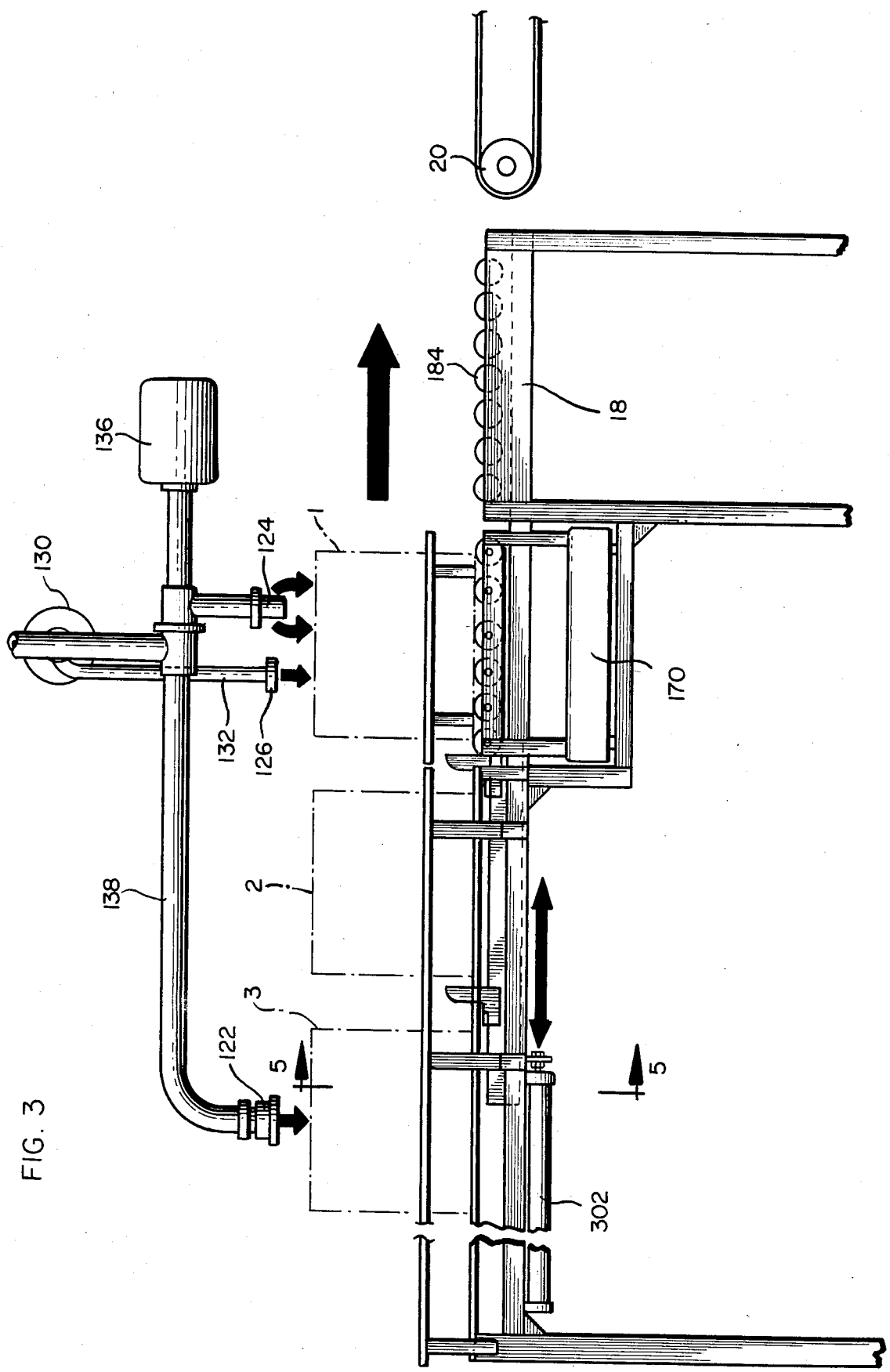

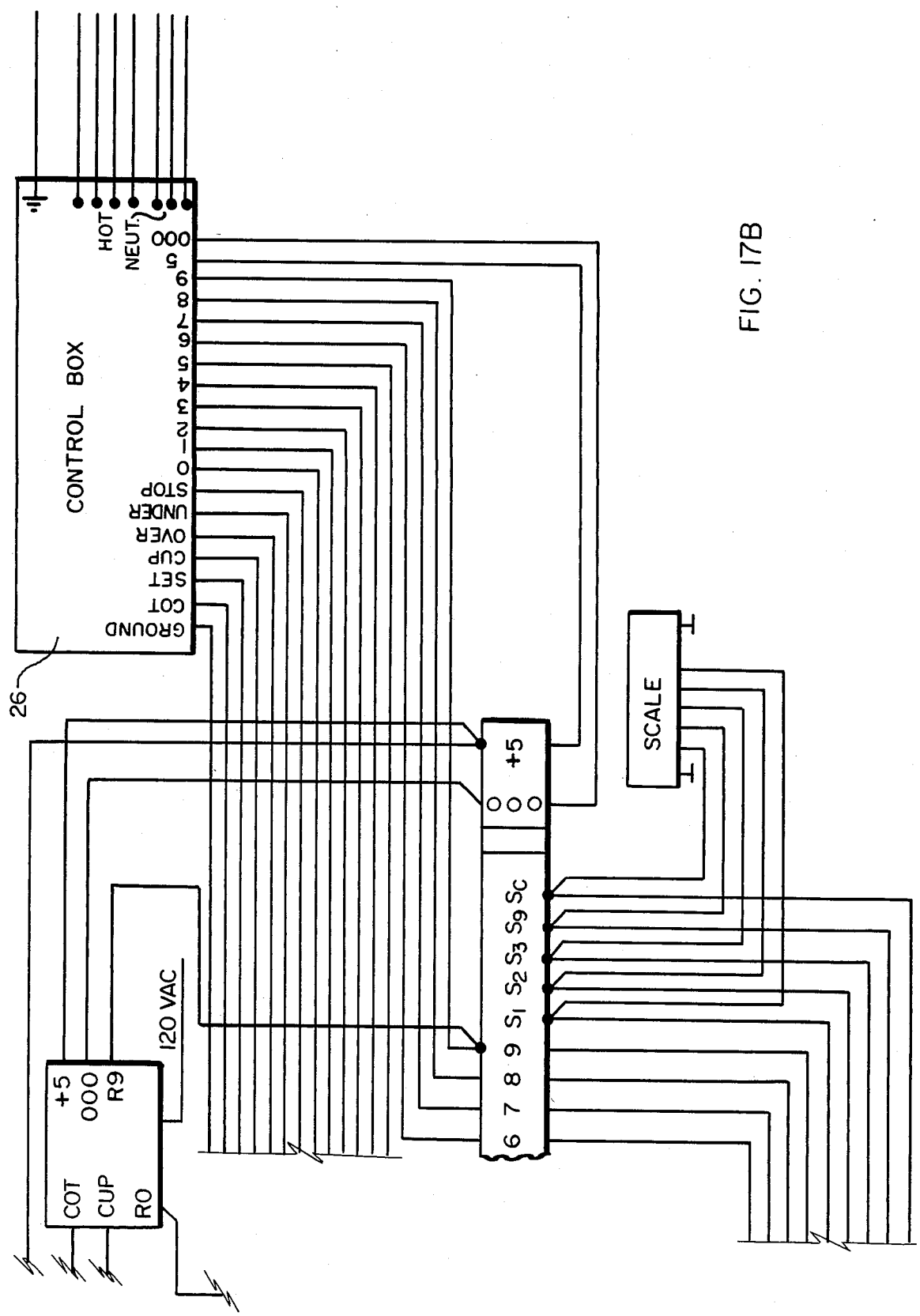

4,749,008

METHODS AND APPARATUS FOR CONTAINER FILLING

BACKGROUND OF THE INVENTION

The present invention relates to the packaging of viscous food products. More particularly, the present invention relates to methods and apparatus for automated container filling for accurately, rapidly and continuously dispensing a desired weight of a viscous food product, such as cream cheese, sour cream, cottage cheese, and edible oils, into a plurality of successive product containers.

Conventionally, large containers for viscous food products such as cream cheese are fed along a production line into a station located beneath a spout from which cream cheese is discharged. The containers are positioned on a weighing scale which, through associated circuitry, terminates the flow of cream cheese from the spout when the scale indicates the desired amount of cream cheese had been introduced into the container. Similarly, edible oil products may be conventionally packaged by starting and stopping an oil pump mechanism in direct response to the container weight on a scale. While such conventional equipment and methods are acceptable for production purposes, they have certain disadvantages. For example, the actual weight of the cream cheese introduced into each respective container may vary and cannot readily be adjusted with a desired level of accuracy. The starting and stopping of pumping apparatus depends on a transient performance.

Substantial effort has been directed to the development of automatic weight and/or volume control systems for packaging operations. For example, automated hopper fill systems such as disclosed in U.S. Pat. Nos. 3,856,097, 3,837,415 and 4,129,189 utilize cumulating hoppers to meter product into containers. However, cream cheese is a viscous product which tends to stick irregularly to the sides of containers. Automated hopper weight control systems are accordingly not suitable for high speed, accurate in-line packaging systems for cream cheese or other viscous fluid food products, because the product will not dump with consistent repeatability from a hopper into a product container to provide packages of precise weight uniformity and accuracy.

Other development effort has been directed to volumetric measuring to achieve portion control, such as disclosed in U.S. Pat. No. 3,648,741. In the filling of bulk, institutional or industrial size packages, such as those containing in the weight range of from about 10 to about 50 pounds of product, high capacity pumping and filling rates are desirable for efficient operation. However, viscous food products such as cream cheese are subject to property variation, depending upon such factors as product temperature and the static head of product in the cooking kettles or storage tanks. Fluctuations in plant voltage and variations in product texture and consistency also provide difficulty for precise product process control and measurement, such that significant disadvantages in the use of a volumetric measuring cylinder for precisely filling large, bulk containers.

In addition, in order to provide a rapid filling rate with maximum throughput and operating efficiency, a product delivery pump desirably should run continuously to maintain reliable and predictable flow control. It is desirable to continuously transfer the viscous food product into containers rather than start and stop a food product pump or recycle the product back to a cooking kettle or other product source. Accordingly, it is an object of the present invention to provide improved methods and apparatus for rapidly and accurately packaging viscous food products. It is a further object to provide such methods and apparatus which are capable of adapting to changing conditions of product properties or operating conditions. These and other objects will become apparent from the following detailed description and the accompanying drawings.

DESCRIPTION OF THE DRAWINGS

FIG. 3 is a side view of the carton ram and scale mechanisms of the apparatus of FIG. 1, in registration with FIG. 2;

FIGS. 17A and 17B are a circuit diagram joined at the right portion of FIG. 17A and the left portion of FIG. 17B of the logic interface between the scale head control box and proximity switches of the apparatus of FIG. 9.

DESCRIPTION OF THE INVENTION

Figure 1:
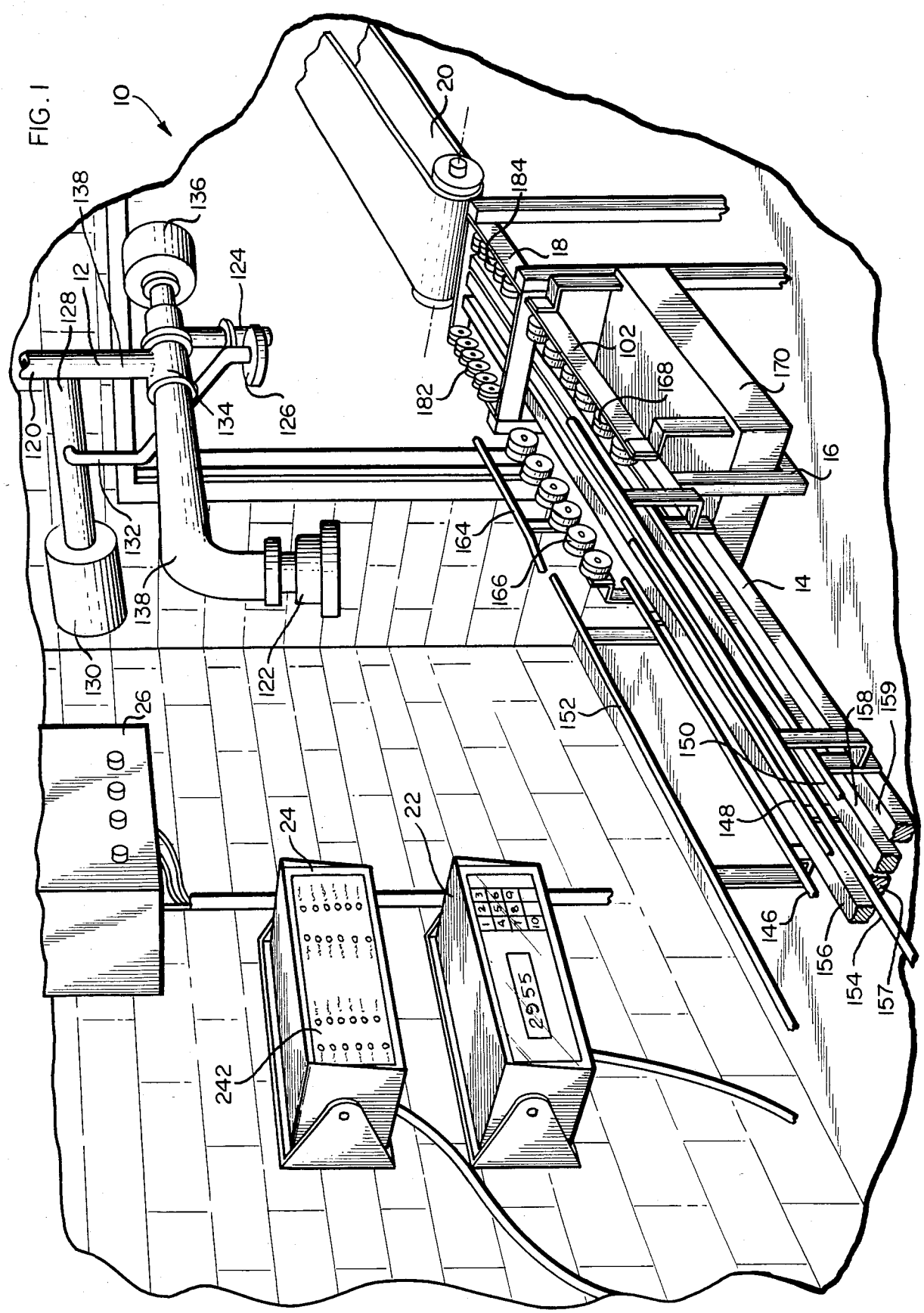
FIG. 1 is a perspective view of an embodiment of automated packaging apparatus in accordance with the present invention.

Generally in accordance with the present invention, methods and apparatus are provided for rapidly and accurately filling product containers with a predetermined weight of a viscous, fluid food product such as cream cheese, neufchatel, cottage cheese, sour cream, edible oils, soups, dressings such as salad dressings, mayonnaise and catsup. Such methods and apparatus are particularly suitable for manufacture of large bulk product containers such as those containing at least about 10 pounds, and more preferably in the range of from about 20 to about 50 pounds of the viscous food product, and may be utilized with conventional as well as aseptic packaging operation. In the practice of such methoos, continuous product packaging rates of at least about 0.5, and more preferably at least about 2 pounds of viscous food product per second may readily be achieved.

In accordance with various method aspects of the present invention, a product supply stream of a viscous food product is provided, desirably at a substantially constant product flow rate. In addition, a sequential plurality of empty food product containers to be filled with an accurately determined amount of the food product within a predetermined weight range are provided. The containers may be of conventional type such as open-topped, plastic-lined bulk product cartons or bulk product barrels in which the food product is introduced into a container opening under conventional or aseptic packaging conditions. The containers may also be valved-type containers such as flexible valved aseptic packaging containers or valved aseptic barrels in which an aseptic food product is introduced from a dispenser through a self-sealing valve mechanism. The containers are sequentially advanced from a prefilling zone to a final filling and weighing zone. Desirably, the containers will be sequentially advanced through a zone intermediate the prefilling zone and the final filling and weighing zone, and will also be positioned in a storage zone prior to entering the prefilling zone. In this regard, it is a particularly advantageous feature of the present invention that in carrying out the method, containers may be substantially simultaneously advanced from the intermediate zone to the final filling and weighing zone, and from the final filling and weighing zone to a filled container discharge zone. Similarly, sequential containers may be substantially simultaneously advanced from the prefilling zone to the intermediate zone, and from the storage zone to the prefilling zone.

Also in accordance with the present invention, at least a portion of the product stream is directed into each container as it is positioned in the prefilling zone to partially fill the container with the predetermined, desired amount of the viscous food product. In this regard, generally from about 10% to about 90%, and preferably from about 40 to about 60% of the desired product weight will be introduced into each container in the prefilling zone in this manner. The product may be introduced from a gravity-feed nozzle through a container opening without contact between the discharge mechanism and the container, or may be introduced by coupling a discharge nozzle to a container filling valve assembly and decoupling the nozzle after the prefilling step.

Also in accordance with method aspects of the present invention, each container positioned at the final filling ano weighing zone is substantially continuously weighed. The term "substantially continuously weighing" includes rapidly periodically weighing the container (including the weight of food product contained therein), such as at a rate of at least about one time per second and preferably at least about four times per second. It will be appreciated that the accuracy of the filling of the container with the viscous food product will depend, at least in part, upon the continuous nature of the weighing of the container (e.g., the interval between sequential weighings) at the final filling and weighing zone.

Further in accordance with the method, the viscous food product is discharged into each container at the final filling and weighing station at a discharge rate which is substantially less than the substantially constant product flow at which the viscous food product is provided. In this regard, the fine filling discharge rate should be less than about half of the pumping rate, and more preferably, less than about 20 percent of the flow rate of the product supply stream which is provided. During the fine filling food product discharge, the weight of the container is continuously compared to a predetermined fine filling cycle activation weight value which may typically be less than the desired weight of the viscous food product to be introduced into the container. Upon reaching the fine filling cycle activation weight, the discharge of food product into the product container positioned at the fine filling and weighing zone is terminated. The fine filling cycle activation weight may be selected to accommodate a weight increase of product in the container attributable to the product which is in transit before complete cessation of product discharge to the container, as well as the time necessary to complete termination of fine filling product discharge into the container. After terminating the fine filling product discharge to the container, the container is weighed and the weight is compared to a predetermined weight range. If the container weight exceeds this range, the fine filling cycle activation weight value is reduced. If the measured final container weight is less than the predetermined final product weight range, than the fine filling cycle activation value is increased. It should be noted that these increased or decreased cycle activation values have no effect on the container which has been filled. These values are used to adjust the system for filling of subsequent containers at the fine filling and weighing station. The adjustment may be carried out by respectively increasing or decreasing the fine filling cycle activation weight value, or by selecting a higher or lower weight value from a plurality of predetermined values, as will become apparent from the following detailed discussion.

Apparatus in accordance with the present invention generally comprises pumping means for providing a continuous stream of viscous food product to be packaged. The viscous food product may typically be cream cheese at a temperature in the range of from about 155° F. to about 175° F., sour cream, cottage cheese, liquid or edible fat products or the like, as previously discussed. It is a particular advantage of the present invention that the pumping means may be operated continuously at a substantially constant rate, so that there is no need for variation of the pumping rate, or slowing or stopping the pumping mechanism. The pumping means may desirably be any suitable sanitary food product pump, such as a centrifugal or positive displacement pump. As indicated, it is particularly desirable that the pump be selected to provide a substantially constant flow of the viscous product stream, because the accuracy of the filling operation depends, at least in part, on the provision of a continuous and predictable flow rate during a fine filling portion of the filling cycle. Typically, the product will be pumped at a relatively high flow rate and low pressure. For example, for cream cheese, a typical continuous pump rate of about 3 pounds per second discharged at atmospheric pressure may utilize only that pumping pressure at the pump discharge necessary to overcome piping resistance to produce the desired flow rate.

By providing means for producing a continuously pumped stream of the fluid food product, a steady-state operation may be achieved which is conducive to accurate product packaging, as will be apparent from the present disclosure.

Apparatus in accordance with the present invention further comprises prefilling station means for receiving a product container to be filled with a predetermined weight of the viscous food product. As discussed, the container is only partially filled at the prefilling station means, and is subsequently filled to the predetermined weight. In this regard, the apparatus further includes a final filling station means for receiving a product container which has been partially filled at the prefilling station means. The containers are accurately filled to predetermined weight at the final product filling station under precise weighing control. In this regard, the apparatus further includes weighing controller means for substantially continuously weighing a product container received at the final container filling station means and for comparing the measured weight of the container with a predetermined cycle activation weight, and for providing a signal indicative of the measured weight of the product container at the final product filling station means corresponding to the predetermined cycle activation weight value. The apparatus may further comprise fine filling cycle activation weight adjustment means for comparing the measured weight of the product container with a desired finished product weight range, and for decreasing the fine filling cycle activation weight if the measured filled product container weight is above the desired final product weight range, and increasing the fine filling cycle activation weight if the measured filled product container weight is below the desired food product weight range. Desirably, the fine filling cycle activation weight adjustment means will store a plurality of at least about 3, and more preferably at least about 5 predetermined fine filling cycle activation weight values, which may be selected under process control, as will be more fully apparent from the following discussion. Alternatively a fine filling cycle activation weight may be stored and updated, for example in computer memory, under logic control.

In order to partially fill product containers at the prefilling station means, the apparatus further comprises prefill discharge means for introducing viscous food product into a product container received at the prefilling station means. For open-topped containers, the prefill discharge means may desirably be a discharge nozzle positioned above the prefilling station. For valved aseptic or conventional containers, a valve-engaging discharge nozzle may be utilized.

As discussed, the coarse and fine filling operations may be carried out by gravity-feed discharge into an open container, or by coupling of one or more discharge valves to the container. In the latter case, system design provides a constant weight delivery system, such as by a freely pivoting connecting conduit which applies a constant weight to the container on the weighing means at the final filling station.

Similarly, in order to complete the filling of the product containers, compound or variable filling means is provided for introducing viscous food product selectively at a first coarse filling flow rate and at a second fine filling flow rate which is less than the coarse filling flow rate. The compound final filling means may include a selectively operable fine filling discharge nozzle and a selectively operable coarse filling discharge nozzle. Alternatively, a single discharge nozzle having different levels of output capacity may be used. It will also be appreciated that the coarse filling nozzle discharge may be carried out in a functionally equivalent manner at an intermediate filling station, but that providing the coarse filling and fine filling discharge at the final filling station is particularly desirable. Typically, the fine filling discharge nozzle will have a rate of discharge which is less than about 40 percent and preferably less than about 25 percent of the slowest discharge rate of the prefilling discharge nozzles during the filling cycle (excluding the "off" portions of the prefilling cycle). In this regard, it is noted that the prefilling discharge rate may vary during the filling cycle to accommodate the final filling cycle.

The apparatus further includes valve means for directing the continuous stream of viscous food product from the pumping means to at least one of the prefilling discharge nozzle means or the compound filling discharge means, and valve means for controlling the flow through the coarse discharge nozzle means and the fine filling discharge nozzle in response to the weighing controller means.

The sequential transport of the containers through the apparatus is an important aspect of the invention, and in this regard, means are provided for sequentially advancing a plurality of containers to the prefilling station means, and from the prefilling station to tne final filling station means. In particularly advantageous embodiments of the present invention, first dual carton ram means is provided for advancing containers from a container storage station means to the prefilling station means and for substantially simultaneously advancing a container from the prefilling station means to an intermediate station means. Second carton ram means is also provided for advancing a container from the intermediate station means to the final filling station means and for substantially simultaneously advancing a container from the final filling and weighing station to a discharge station. The first carton ram means and the second carton ram means operate alternatively to provide proper timing for the filling operation.

Turning now to the figures, the present invention will now be more particularly described with respect to the embodiment 10 of cream cheese bulk container filling apparatus which is generally illustrated in FIG. 1, further mechanical details of which are shown in FIGS. 2-5.

Generally as shown in FIG. 1, which is a perspective view of the apparatus 10 shown without packaging containers or dual carton ram assemblies for purposes of clarity, comprises a product filling assembly 12, an infeed container transport system 14, a weighing section 16, a discharge section 18, and a discharge conveyor 20. The apparatus further comprises a scale control mechanism 22, a display unit 24, and a control box 26. The apparatus 10 is particularly adapted for packaging of cream cheese into square containers, or cartons 1, 2, 3 (see FIGS. 2, 3 and 5) designed to hold approximately 30 pounds of cream cheese. In operation, the containers progressively advance from the infeed container transport system 14 to the weighing section 16, where they are eventually filled with the cream cheese product. The filled containers are transported from the discharge section 18 and discharge conveyor 20 to a conventional package closure station (not shown) and customer distribution.

The control portion of the illustrated apparatus 10 comprises a solid-state logic system for matching measured weights with a preset calibrated desired final product weight. In the illustrated embodiment, two connected 4-wide shift registers are used to choose which of a plurality of pre-set cycle activation target weights is required for correct final weight fills under continuous operating conditions. As will be described, the apparatus 10 permits continuous fill from a delivery pump by prefilling a container upstream while finally filling the product container on a scale head to a high degree of accuracy which is predictably characteristic of the steady-state or repetitive operation of the process control elements. An overlapping carton ram system is used to permit continual product discharge from a pump while at the same time providing for filled packages to be accurately weighed on a scale head so that the weight of a product container may be very accurately checked. Because the amount of product deposited into each respective container during the final filling process is independent of the amount of product which is prefilled into the container, resonance or oscillation-accumulation inaccuracies are eliminated.

Ideally, the target weight should not have to be changed during a run. However, process or product conditions may change, and accordingly, the apparatus is adaptive to such changed conditions to provide packaged product weights. The apparatus 10 measures each filled container and compares the weight to a predetermined weight range determined by preselected over and under weight values. In the illustrated embodiment 10, an accurate scale is utilized which permits a storing of a plurality of "cut-off weights", or cycle activation weights and comparison of measurd weight the stored weight. Various comparisons are utilized in the operation of the apparatus 10. When the weight of a filled container falls outside the predetermined range, a different target weight is chosen as the cycle activation value for the succeeding container. When the controller registers and "over" condition, for example, a lower fine filling cycle activation weight value will be chosen for the next container.

The production line may include conventional apparatus for automatically erecting the product containers and transferring them to the filling apparatus 10. In the apparatus 10, the containers are transferred under control of an automated dual carton ram system which provides for efficient container movement for product distribution at multiple filling stations, so that a maximum filling rate may be obtained while maintaining predictable, steady-state operation of the system.

The control circuitry of the automated filling apparatus 10 presents a visual display at display unit 24 of its operation and progression through its sequencing state. The progression at each state is shown by a plurality of light emitting diodes (LED's) 242. Each LED display corresponds to a cut-off target weight which is preset by the scale controller 22. If the apparatus 10 senses that more than a predetermined upper value, e.g., in the range of 30.5 to 32 pounds, it will automatically turn itself off. The apparatus further includes at least two proximity switches to detect the presence of a container at the prefilling station, and at the final filling station, respectively. The apparatus automatically is turned off if the proximity switches do not detect the presence of a container at these locations during filling operation.

In operation, cream cheese is pumped by a conventional food quality centrifugal pump (not shown) at a constant rate from a conventional cream cheese kettle (not shown) to the cream cheese filling system 12. In the illustrated embodiment 10, the continuous stream of cream cheese which is pumped through conduit 120 by the pumping mechanism is distributed by appropriate valves to a prefill discharge nozzle 122, a coarse fill nozzle 124 and a fine filling nozzle 126. In this regard, a Tee valve 128 under control of solenoid 120 controls the flow of cream cheese from conduit 120 through fine filling conduit 132 which is discharged at fine filling nozzle 126. Similarly, the flow of cream cheese from conduit 120 is controlled by three-way valve 134 under control of three-way valve solenoid 136, which directs the flow of cream cheese from conduit section 138 to either (or temporarily) coarse filling nozzle 124 or prefilling nozzle 122 through conduit segment 138. The sequencing and control of product flow from each of the various nozzles 122, 124, 126 by means of the valve units 128, 134, in conjunction with the other aspects of the filling operation, form an important part of the present invention. The product discharge must be coordinated with the placement of the product containers under the discharge nozzles 122, 124, 126 in a specific operational sequence. In the illustrated embodiment 10, the transport of the product containers is carried out under the control of dual carton feed rams 142, 144 of the input container transport system 14. In operation, unfilled cartons, which are continuously provided by appropriate conventional carton feed mechanism (not shown) are transported by upstream ram 142 and alternately acting downstream ram 144. In the illustrated embodiment, the cartons are supported by bottom support rails 146, 148, 150, and are guided by side rails 152, 154, which are spaced apart a distance only slightly greater than the width of the square containers which are processed by the system 10. As will be described in more detail in respect to FIG. 2, each of the carton rams 142, 144 is adapted to move two adjacent containers in a downstream flow direction. The rams 142, 144 are staggered in overlapping relationship so that transport through the apparatus 10 may be accomplished by the cyclic, reciprocating operation of the carton rams 142, 144 in an alternating manner. As shown in FIG. 1, the infeed container transport system 14 includes a pair of rectangular guide rails 156, 157 for guiding and supporting the first dual carton ram 142, and a second pair of rectangular guide rails 158, 159 for guiding and supporting the carton ram 144. The guide rails 152, 154 and the support rails 146, 148, 150 extend only to the weighing section 16 of the apparatus 10. However, the support rails 156, 157, 158, 159 for the rams 142, 144 extend as structual members through the infeed transport zone 14, the weighing station 16, and the discharge station 18, although they do not contact the scale head assembly of the weighing station. The weighing station 16 comprises a container support assembly 162 comprising a guide rail 164 generally aligned with the guide rail 152, and roller wheel assemblies 166, 168 generally defining a container bottom contacting surface aligned with the plane of the support rails 146, 148, 150, which are independently supported atop weighing scale head 170. The assembly 162 contacts only the weighing scale head 170 such that when a container is placed atop the assembly 162, the weight of the container may be determined without contact with any surface which is not supported by the scale head 170. A similar series of support rollers 182, 184 is positioned at the discharge station adjacent the weighing station, so that the container may be readily discharged to the conveyor station 20 from the weighing station 16 by operation of the dual carton ram 144.

Figure 2:
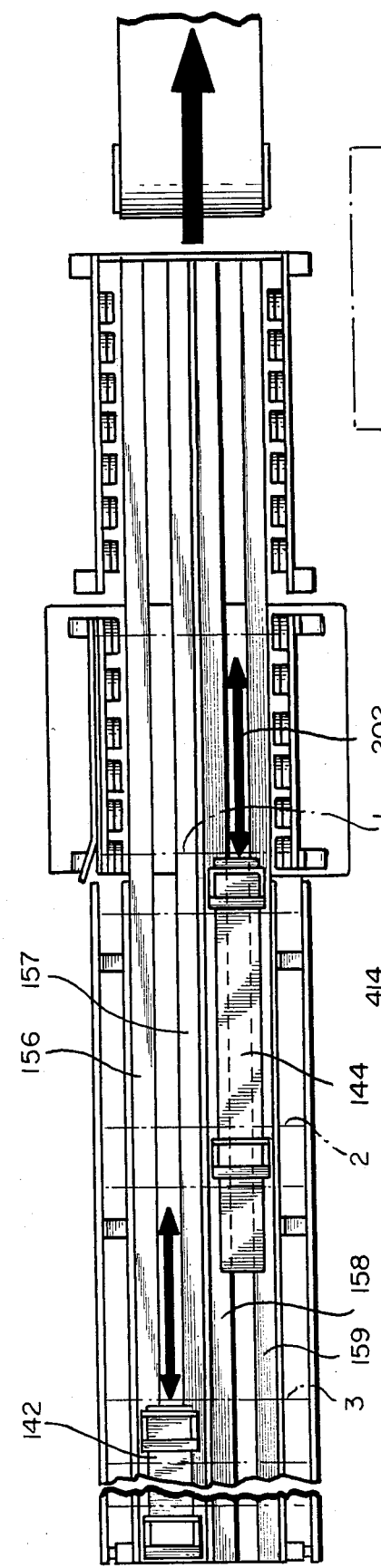
FIG. 2 is a top view of the carton ram and scale mechanisms of the apparatus of FIG. 1.
Figure 4:
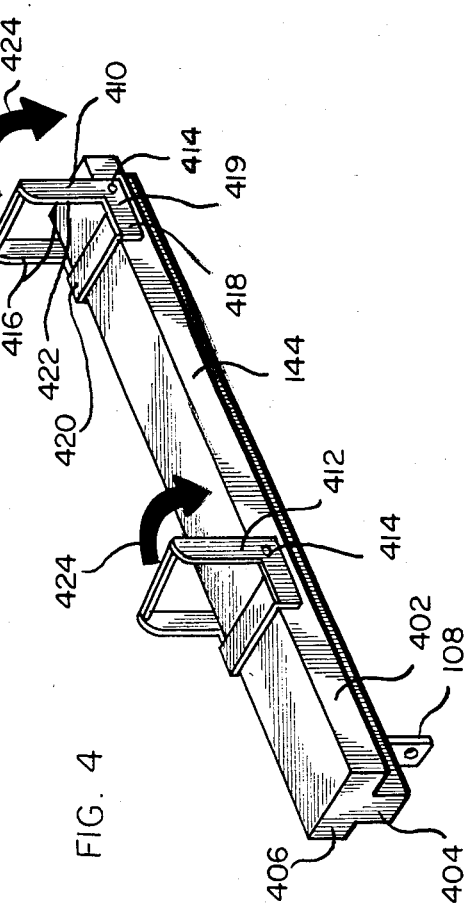
FIG. 4, is a prespective view of one of the two carton rams of the apparatus of FIG. 1.

The positioning and operation of the ram units 142, 144 is important in the operation of the apparatus 10. In this regard, illustrated in FIGS. 2 and 3 are shown the placement of the ram assemblies 142, 144 together with the positioning of product containers designated by numerals 1, 2 and 3. One of the dual carton ram assemblies 144 is illustrated in detailed perspective view in FIG. 4, with the other carton ram assembly 142 being substantially similar thereto. As shown in FIG. 4, the dual carton ram assembly 144 comprises an elongated T-bar 402 having a vertical stem section 404 of a width slightly less than the separation distance between the horizontal guide bars 158, 159 which guide its travel in a direction along the length of the apparatus 10 as shown by arrow 202 (FIG. 2). The T-bar 402 further comprises a horizontal support section 406 integrally connected with the vertical guide section 404, having a width greater than the distance between the guide members 158, 160 of the apparatus 10 so that the dual carton ram element 402 is retained atop the guide elements 158, 160 in sliding engagement therewith. A friction reducing surface such as a polytetrafluoroethylene sheet material may be provided between the contacting surfaces of the movable carton ram 144 and the fixed surfaces of the guide elements 158, 159. The ram 144 further includes a fastening plate 408 for connection with a bidirectional pneumatic cylinder 302 (FIG. 3) for controlling the reciprocal movement of the dual carton ram 144. The dual carton ram 144 further comprises two unidirectional carton pushing assemblies 410, 412 which are each respectively pivotally mounted at the top surface of the horizontal guideplate 406 of the ram element 402 by means of hinge bolts 414. The front carton pushing element 410 and rear carton pushing element 412 of each ram assembly are spaced apart a distance which corresponds to the container length (in the direction of travel) plus the desired spacing between the containers (See FIG. 2). It will also be appreciated that the distance of reciprocating motion of each carton ram assembly 142, 144 along the respective guide rails 156, 157, 158, 159 will generally be a distance longer than the carton length, but approximately equal to or greater than the carton length plus the desired spacing distance between the cartons. Each of the front and rear carton pushing elements 410, 412 of the dual carton ram assemblies 142, 144 has a front carton-pushing face defined by cross-bar 414 and upstanding legs 416 of L-shaped pivoting side pieces 418. A balance and stop bar 420 maintains the pusher elements in an upright position when a force is applied against the front face, as by contact and pushing engagement with a container. However, upon application of force to the rear surfaces 422 of the upstanding elements 416, the carton pushing assemblies 410, 412 are free to rotate about the pivot 414 as shown by arrows 424 so that the carton ram may be retracted without moving the cartons. The weight of the cross piece 420, and the weight and distance of the lower portions 419 of the L-shaped side pieces 418 are such that the carton pushing elements normally remain in, and restore themselves to, an upright position, and may readily be withdrawn after pushing of the cartons in a forward direction without backward movement of the cartons. The pushing assemblies may be linked by a control bar to assure reliable operation of both elements.

Figure 5:
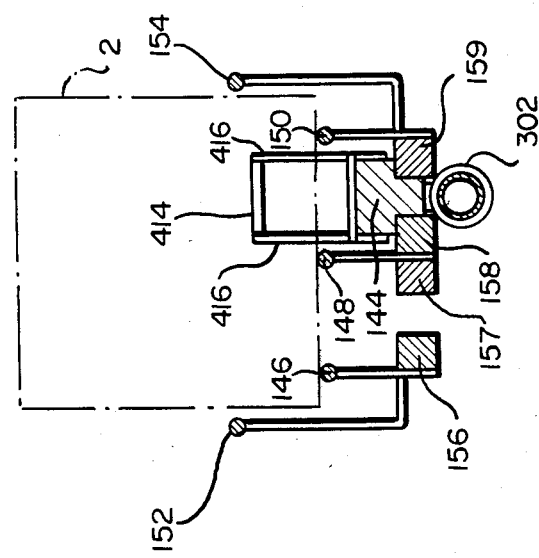
FIG. 5 is an end view of the apparatus of FIG. 1 depicting the dual carton ram apparatus.

FIG. 5 is a rear view, taken through line 5—5 of FIG. 3, illustrating the dual action pneumatic cylinder 302, and the positioning of the carton ram assembly 144 in respect to the product container 2, which permits the reliable operation of the dual carton ram upon activation of the pneumatic cylinder.

The dual carton ram assembly 142 is substantially identical to the ram assembly 144, but is displaced in staggered relationship by a distance of one container length and container separation length in a direction upstream of the carton ram assembly 144. The carton ram assembly 142 is similarly provided with a pneumatic driving cylinder. The operation of the dual acting hydraulic cylinders is coordinated and timed in respect to the product container movement requirements of the apparatus 10 under control of appropriate electronic circuitry.

Figure 6:
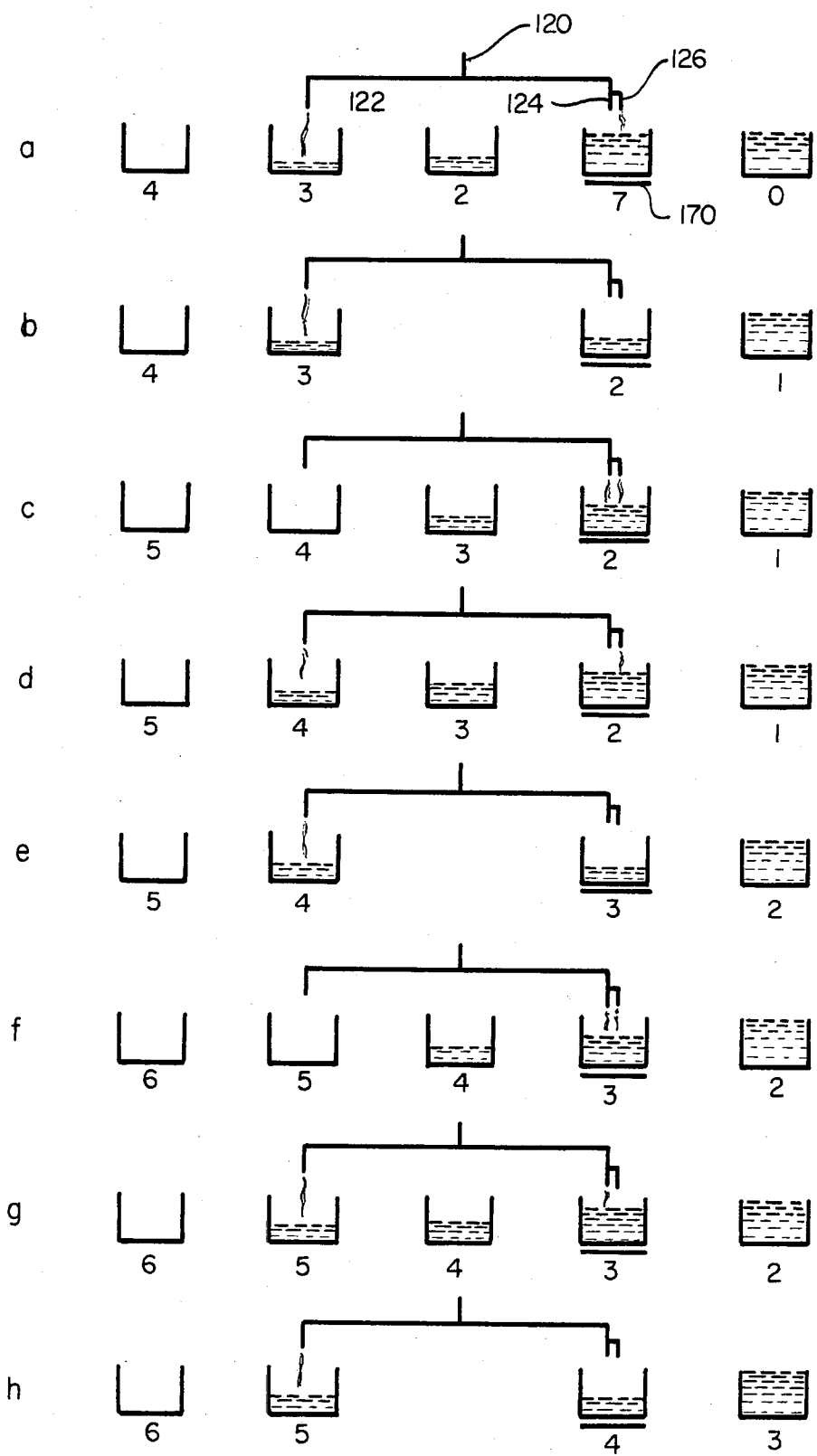
FIG. 6 is a timing diagram illustrating the processing steps carried out by the apparatus of FIG. 1 in container filling operation.

In this regard, shown in FIG. 6 is a series of schematic illustrations a–h depicting successive conditions of package filling operation of the apparatus 10 of FIG. 1. In these illustrations, container flow is generally from left to right, with the prefilling station being located under prefill discharge nozzle 122, and the final filling station being located under coarse filling nozzle 124 and fine filling nozzle 126. The weighing scale head 170 which provides an output signal for controlling system operation, is located at the final filling station, as previously discussed.

FIG. 6a depicts a point in the packaging cycle at which a fully filled container 0 having an accurately dispensed weight of 30 pounds of product discharged thereinto by the apparatus 10, has been discharged from the system for container closure by means of a conventional case sealer, and customer distribution. At the packaging cycle position illustrated by FIG. 6a, container 1 is positioned atop the scale 170 having a weight of cream cheese therein of between about 27 pounds and 30 pounds of cream cheese. A product container 2 which has earlier been prefilled with from about 9 to about 25 (typically about 15) pounds of cream cheese is positioned between the prefill station and the final fill station. A product container 3 is being prefilled with cream cheese up to an amount which in the illustrated embodiment may be in the range of from about 9 to about 25 pounds. An empty container 4 awaits processing. The system product pump (not shown), which may be a food grade centrifugal pump, is continuously pumping a viscous cream cheese product from a cream cheese cooking kettle holding tank at a steady rate of about three pounds per second through conduit 120.

The three-way valve 134, 136 controlling the flow of cream cheese to the coarse-filling nozzle 124 is in a closed position diverting (excess) flow to the prefilling discharge nozzle 122 so that only the fine filling discharge nozzle 126 is discharging viscous cream cheese into the container 1 atop the weighing scale 170. In the illustrated embodiment, the nozzle 126 discharge characteristics are selected so that the nozzle discharges cream cheese at about one-half pound per second into the container 1. Because the valve controlling flow to the coarse nozzle 124 is in closed position, the remaining portion of the approximately three pounds per second of cream cheese continuously and steadily pumped into conduit 120 is discharged through prefill nozzle 122 into container 3, at about 2.5 pounds per second at the prefilling station as shown in FIG. 6a. The weight of the container 1 is continuously monitored by the scale 170 at a scan rate of about 5 updates per second.

Immediately upon reaching a predetermined cycle actuation weight value, which in the illustrated embodiment is one of a plurality of different preselected target weight limits which are less than the weight of cream cheese desired in the container 1, the valve controlling flow to the fine filling discharge nozzle 126 is closed, so that the entire amount of the continuous flow of cream cheese pumped through conduit 120 is diverted and discharged through the prefilling nozzle 122 into container 3. At the time the valve 128, 130 controlling the flow through the fine filling nozzle 126 initiates the cessation of product flow through conduit 132 and fine filling discharge nozzle 126, a small portion of cream cheese is in transit between the nozzle system and the container 1. The closing of the valve 128, 130 also takes a finite amount of time (which may be characteristic of a particular valve assembly) which tends to ultimately increase the weight of product in the container 1 above that measured at the time of activation. These factors are accounted for in the selection (and adjustment) of the fine filling cycle activation weight value.

The packaging cycle further includes a settling period, beginning after the closure of the valve 128, 130 controlling the flow through fine filling discharge nozzle 126, which in the illustrated embodiment may typically have a duration in the range of from about 0.5 to about 2 seconds. During this settling period, the remaining cream cheese which was in transit following complete valve closure between the discharge nozzle 126 and the container 1 will have been placed in the container and the momentum effects of the discharge will have been damped, so that an accurate measurement of the weight of cream cheese in the container 1 atop the weighing scale 170 may be obtained. The actual weight value of the container 1 is compared against the predetermined, desired weight value range for the container. If the container weight is within the desired range, no adjustment to the predetermined cycle activation value for the fine filling nozzle 126 is made. However, if the measured weight of the container 1 is above the desired product weight range, the cycle activation weight value is adjusted downward, as will be described in more detail hereinafter. Similarly, if the measured weight is below the desired weight range, the predetermined cycle activation weight value for termination of the flow through nozzle 126 is adjusted upward, as will similarly be described.

As shown in FIG. 6b, immediately after the container 1 is weighed, and while the entire flow of cream cheese into conduit 120 is being discharged at the prefilling station through nozzle 122. The filled container 1 and the partially filled intermediate container 2 are simultaneously moved by action of the dual carton ram 144 upon extension activation of the pneumatic cylinder 302 associated therewith. In this regard, the filled container 1 is moved from the final filling station for container sealing and distribution. Simultaneously, partially filled container 2 is moved from its position intermediate the prefilling station and the final filling station, to a position atop the scale 170 under the coarse filling nozzle 124 and fine filling nozzle 126. At this time in the cycle of operation, the coarse filling nozzle and the fine filling nozzle are closed by the appropriate control valves 128, 130, 134, 136. After transfer, the dual carton ram 144 is retracted to its original, closed position upon retraction activation of the pneumatic cylinder 302. The transfer of containers 1 and 2 in this manner takes approximately 1-2 seconds in the illustrated embodiment 10.

As shown in FIG. 6c, immediately after moving containers 1 and 2, as described, the valves 128, 130, 134, 136 controlling coarse filling nozzle 124 and fine filling nozzle 126 are opened, so that the flow of cream cheese is directed into the partially filled container 2. Simultaneously with, or slightly after, the opening of the valve controlling fine filling nozzle 126, the three-way valve controlling the discharge of cream cheese product through the prefilling nozzle 122 causes cessation of product flow from the prefilling nozzle 122, thereby permitting the partially filled container 3 to be advanced from under the prefilling nozzle. The continuous, steady flow of cream cheese is maintained from the pump through conduit 120 by appropriate valve control. After discharge of cream cheese from the prefilling nozzle 122 is stopped, operation of the upstream dual carton ram assembly 142 is initiated by extension activation of the hydraulic cylinder associated therewith, to simultaneously advance partially filled container 3, and empty container 4, by one station position. In this regard, partially filled container 3 is moved into a position intermediate the prefilling station and the final filling station. Simultaneously, the empty container 4 is advanced to a position at the prefilling station under the (now closed) prefilling nozzle 122. A new empty container 5 is advanced into a position for subsequent placement under the prefilling nozzle 122 at the prefilling station. After the transfer, the dual carton ram 142 is retracted to its original, closed position by retraction operation of its hydraulic cylinder. The transfer of containers 3 and 4 in this manner is accomplished in about 1-2 seconds in the illustrated embodiment 10.

During transfer operation of the dual ram 142, the entire flow of viscous cream cheese from the pump through conduit 120 is discharged through the coarse filling nozzle 124 and the fine filling nozzle 126 until the weight of the container reaches a predetermined coarse filling cycle activation weight, which is continuously monitored by the scale 170. This coarse filling cycle activation weight may typically be about 27 pounds in the illustrated embodiment 10. However, it will be appreciated that the accuracy of this weight determination may be relatively low, and need not be adjusted during the packaging cycle.

As shown in FIG. 6d, upon reaching the predetermined coarse filling cycle activation weight, the three-way valve 134, 136 diverts the cream cheese product flow to prefill nozzle 122 simultaneously with terminating product discharge from the coarse filling nozzle 124, so that the continuous steady flow of the cream cheese product from the pump through the conduit 120 is not interrupted or disturbed significantly. The cream cheese is subsequently introduced into the container 2 by the fine filling nozzle discharge 126 at the relatively slow rate of about 0.5 pounds per second until the predetermined cycle activation weight is reached, at which time the packaging cycle is repeated as previously described with respect to FIG. 6a-c. In this regard, a subsequent container filling cycle involving successive containers 2, 3, 4, 5 and 6 is similarly shown in FIGS. 6d-f, which is the same as the cycle steps shown in FIGS. 3a-c, but with successively subsequent containers 2, 3 4, 5 and 6. FIGS. 6g and 6h continue the process step illustration.

It should be noted that the apparatus 10 illustrated is FIGS. 1–17 does not utilize timing networks to determine how much product is filled to each respective container. The apparatus continuously checks the weight of product in the container, with the speed of update corresponding to the scan rate of the scale. After each container is filled, the apparatus 10 permits the scale to settle (one-half second to 2 second settling period in the illustrated embodiment) and compares the final weight with a standard reference range. This comparison is utilized to either maintain, or appropriately adjust the cycle activation weight value utilized to trigger termination of fine filling product discharge to the succeeding product container.

As indicated, the automated filling apparatus 10 comprises an interface and circuitry for automatic weight control. The circuitry operates the appropriate valves 130, 136, pneumatic cylinders for the carton rams 142, 144, etc. in response to the activation of 10 outputs from the scale whih in the illustrated embodiment 10 comprises a Weigh-Tronix Model WI 110 weight indicator of the Weigh-Tronix Company, which includes the scale head 170 and the scale head control system 22.

Figure 7:
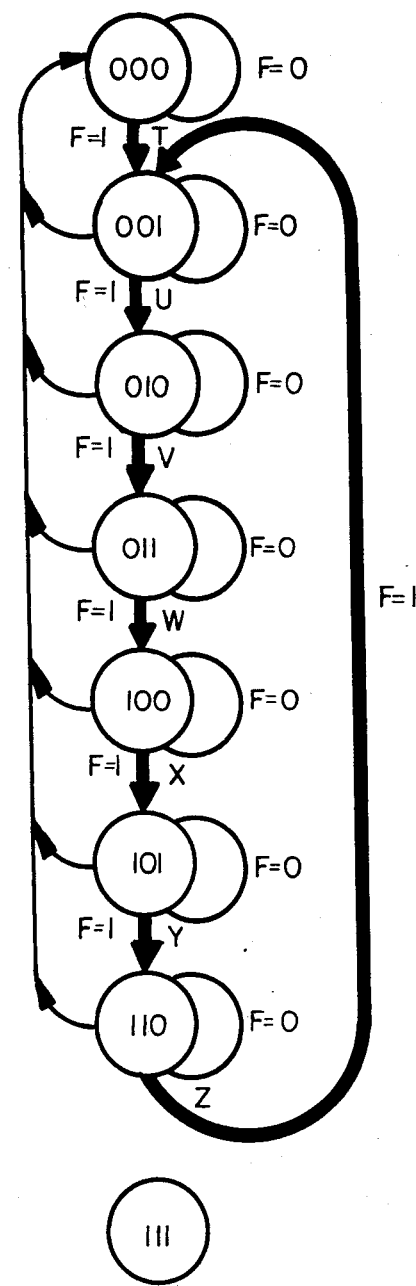
FIG. 7 is a state variable flow chart ilustration of the operation of the apparatus of FIG. 1 to achieve the processing steps generally depicted in FIG. 6.

Illustrated in FIG. 7 is a state variable flow chart depicting the operation of the apparatus of FIG. 1, for implementing the functional timing diagram of FIG. 6. The logic states are depicted in circles labeled 000, 001, 010, 010, 100, 101 and 110, which represent sequential operational states of the apparatus 10. As the system 10 enters each one of these states, appropriate valves are opened or closed, rams are actuated, weight cut-offs are determined and/or delays are executed, as appropriately determined by the desired system state. The normal operation is described in FIG. 7 by the thicker arrows, where logic function F=1. In state 000, the rams 142, 144 are fully retracted and locked, the product pump is turned off, the coarse fill valve is open and the final fill valve is closed. This state 000 is obtained when an apparatus stop button is pushed, for reasons such as intentional termination of a packaging run, or unintentional presence of excess cream cheese on the scale, or absence of containers at the prefilling station or the final filling station. When the appropriate signal from the function board (to be described) designated as F, remains a logical zero, the apparatus remains in state 000. When the logic signal F=1, such as by activation of the start button, the apparatus 10 advances from state 000 to 001, where it remains until logical control signal F again changes to a logic value of one. In state 001, cream cheese is discharged from both the coarse fill and fine fill front nozzles 124, 126 until the scale 170 reaches 27 pounds (net weight of cream cheese). When the scale reaches the coarse fill cycle activation weight of 27 pounds (this coarse cut-off weight is stored in the Weigh-Tronix scale control unit 22), logical function F will equal 1, and the system 10 will advance from state 001 to state 010. In state 010, cream cheese is discharged through the final fill nozzle 126 until it reaches the fine fill cycle activation target cut-off set point (similarly stored in the scale control unit 22). When it reaches that set point, logical F will equal 1, and the apparatus 10 will move to stat 011.

In logical state 011, the final fill valve 130 is closed. The system remains in state 011 until a one-second delay is accomplished to allow the scale head 170 to settle out. After a one-second delay, logical function F is again set to 1, and the system advances to state 100, where it remains until the ram 144 advanced the intermediate station container to the final filling and weighing station, and moves the filled container off the scale head, after which the apparatus advances to state 101. In state 101, a one-second delay is executed after which the system advances to state 110. In state 110, the back ram 142 is activated to advance an empty carton to the prefilling station and a partially filled carton is advanced from the prefilling station to the intermediate station. After that movement takes place, logical function F is set to one again, and the system advances to the 001 states, with the entire cycle being repeated. In the event of malfunction or operator intervention, the system state may be returned to state 000 (stop), as shown in FIG. 7. The operational cycle illustrated in FIGS. 6 and 7 may be carried out by electronic apparatus designed in a variety of ways.

Figure 8A:
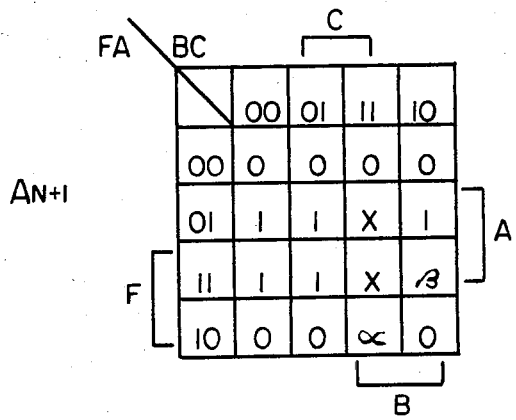
FIGS. 8a, 8b and 8c are Karnaugh maps derived from the state variable flow chart of FIG. 7 depicting specific circuit implementation utilizing specific JK flip-flop logic circuits.
Figure 8B:
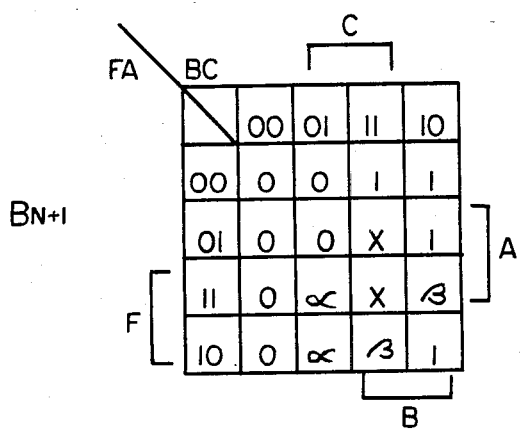
Figure 8C:
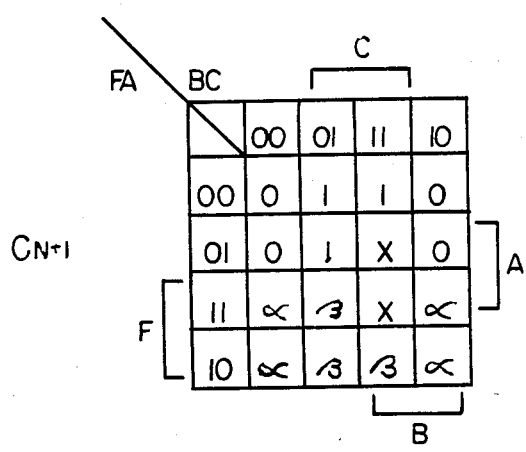

FIGS. 8a, 8b and 8c constitute a Kornaugh map showing the implementation of the state variable system of FIG. 7 by means of 7410 JK flip-flops. FIG. 8a corresponds to the a-bit (left most, most significant bit) of the three-bit logic state of the diagram of FIG. 7. FIG. 8b corresponds to the b-bit (intermediate, center bit) and FIG. 8c corresponds to the c-bit (right most, least significant bit) of the logic state of FIG. 7. JK logic flip-flops which output logic 0 and logic 1 states are changed according to the map of FIG. 7 by the implementation of the J and K inputs shown in FIG. 8. In the conventional notation there shown, a numeral 0 in the body of the charts of FIGS. 8a–c indicates logic condition 0, and a numeral 1 indicates logic condition 1, an "X" indicates that the state is irrelevant, an alpha indicates a transition from a 0 to 1 and a beta inoicates a transition from 1 to 0.

Figure 9:
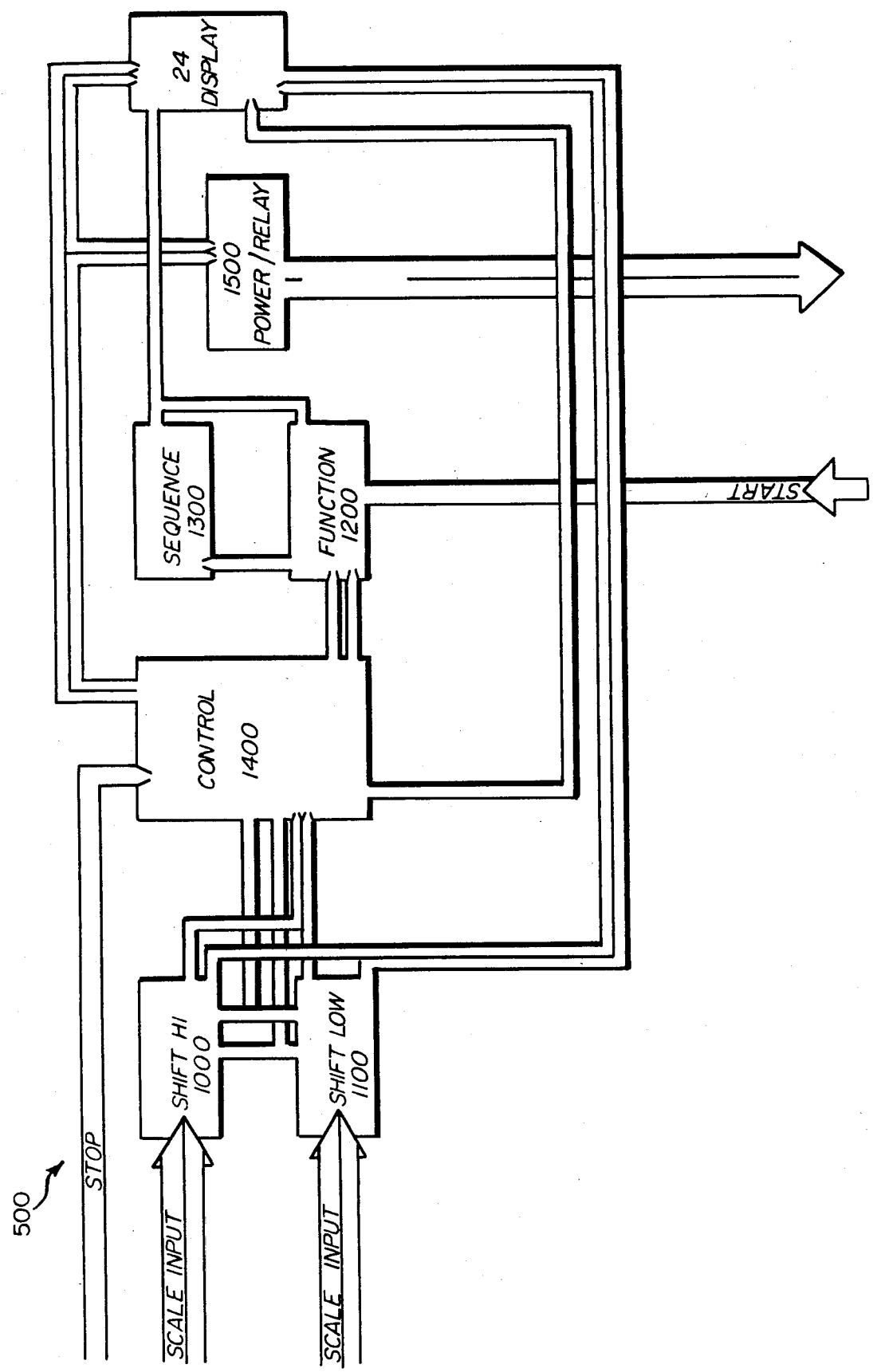
FIG. 9 is a schematic diagram of the electronic control system of the apparatus of FIG. 1.

A specific embodiment of control circuitry 500 implementing the JK logic diagrams of FIG. 8 is shown in FIGS. 9–18. In this regard, FIG. 9, is a block diagram of the principal components of the control circuitry. Functional subcircuits and connection components are further shown by circuit diagram in FIGS. 10–18. The functional subcircuits are interconnected as shown in FIG. 9. In this regard, signal inputs from the scale controller 22 and its scale head 170 are directed to the shift high and shift low circuits 1000, 1100. Start and stop button control lines also function as signal inputs to the system, as shown in FIG. 9. The shift high and shift low circuits 1000, 1100 determine when the scale signal and the control target signals match, to determine the cycle actuation cut-off value.

Changing of the fine filling cycle activation target weight is accomplished through the control board 1400, which directs the high and low shift register boards 1000, 1100 to raise or lower the fine filing cycle activation cut-off weight that is chosen for a match. The control board 1400 also directs an output to the display board 24 so that the status of the various valves, rams and weight conditions may be shown at the display board. The control board 1400 also provides an output signal to the function board 1200 for timing delays, whicn are controlled on the control board. An output is also provided to the power relay board 1500.

The function board 1200 receives input signals from the control board 1400 and external signals to determine the current logic state of the sequence board 1300 and to direct advancement to the next state. In this regard, the sequence board 1300 carries out the logical process map of FIGS. 6, 7 and 8 and receives input from the function board 1200 as to when to change its logical state. The sequence board's output is the logic state of the system, which is directed to the display board 24 and to the function board 1200. The power relay board 1500 provides power to the 5 volt logic circuitry from a 120 volt input, as well as 5 volt signals to solid state relays for operation of solenoids, and 5 volt signals from proximity sensors positioned at the prefilling station, and the final filling station, as well as at the end of the extended carton ram travl positions, respectively. The display board 24 comprises light emitting diodes (LED's) to display the current status of the apparatus 10. The display board 24 receives information from the shift register boards 1000, 1100, the control board 1400, the sequence board 1300, the function board 1200 and the power relay board 1500.

Figure 10:
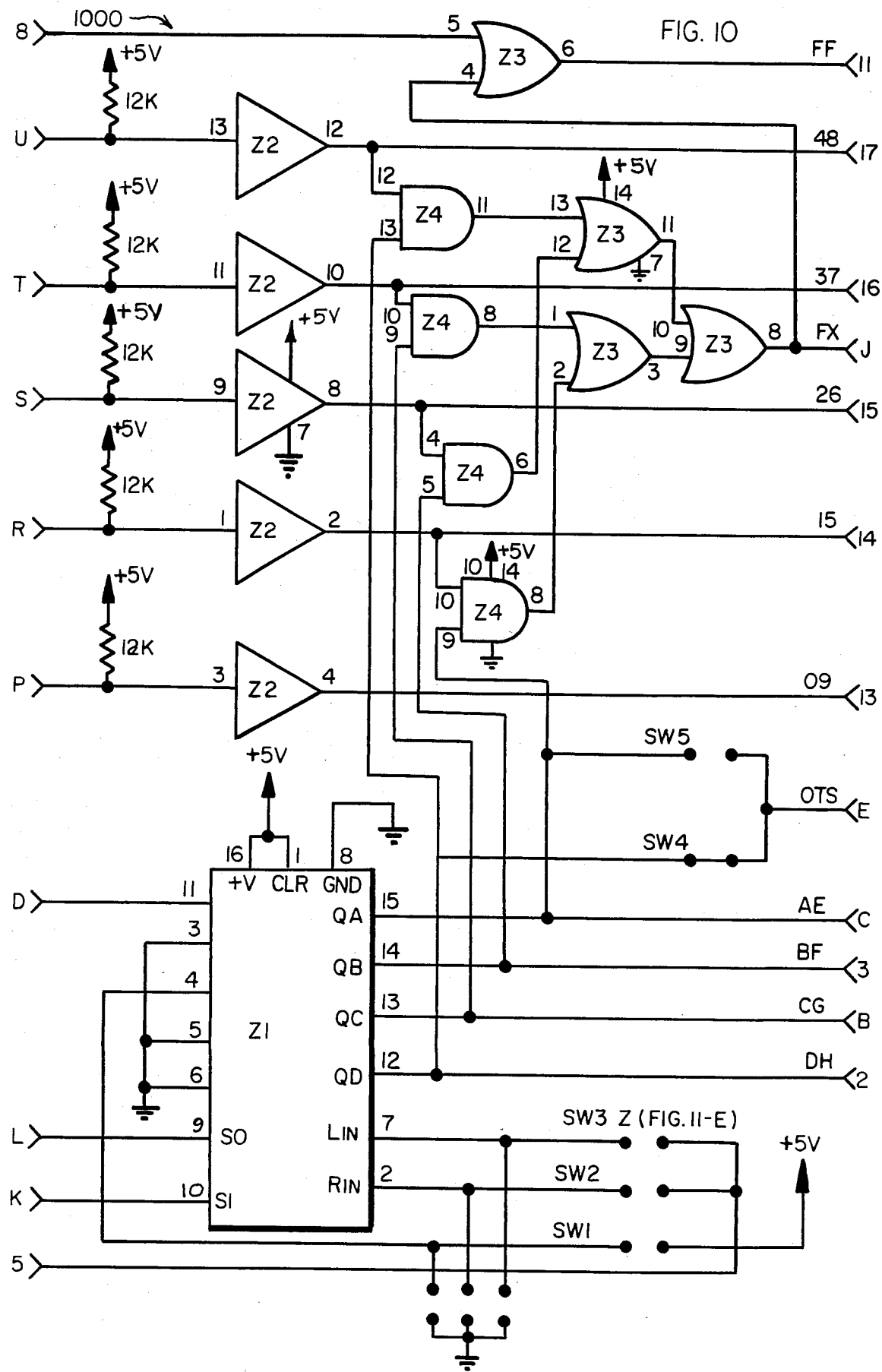
FIG. 10 is a circuit diagram of the shift low circuit element of the control system of FIG. 9.
Figure 11:
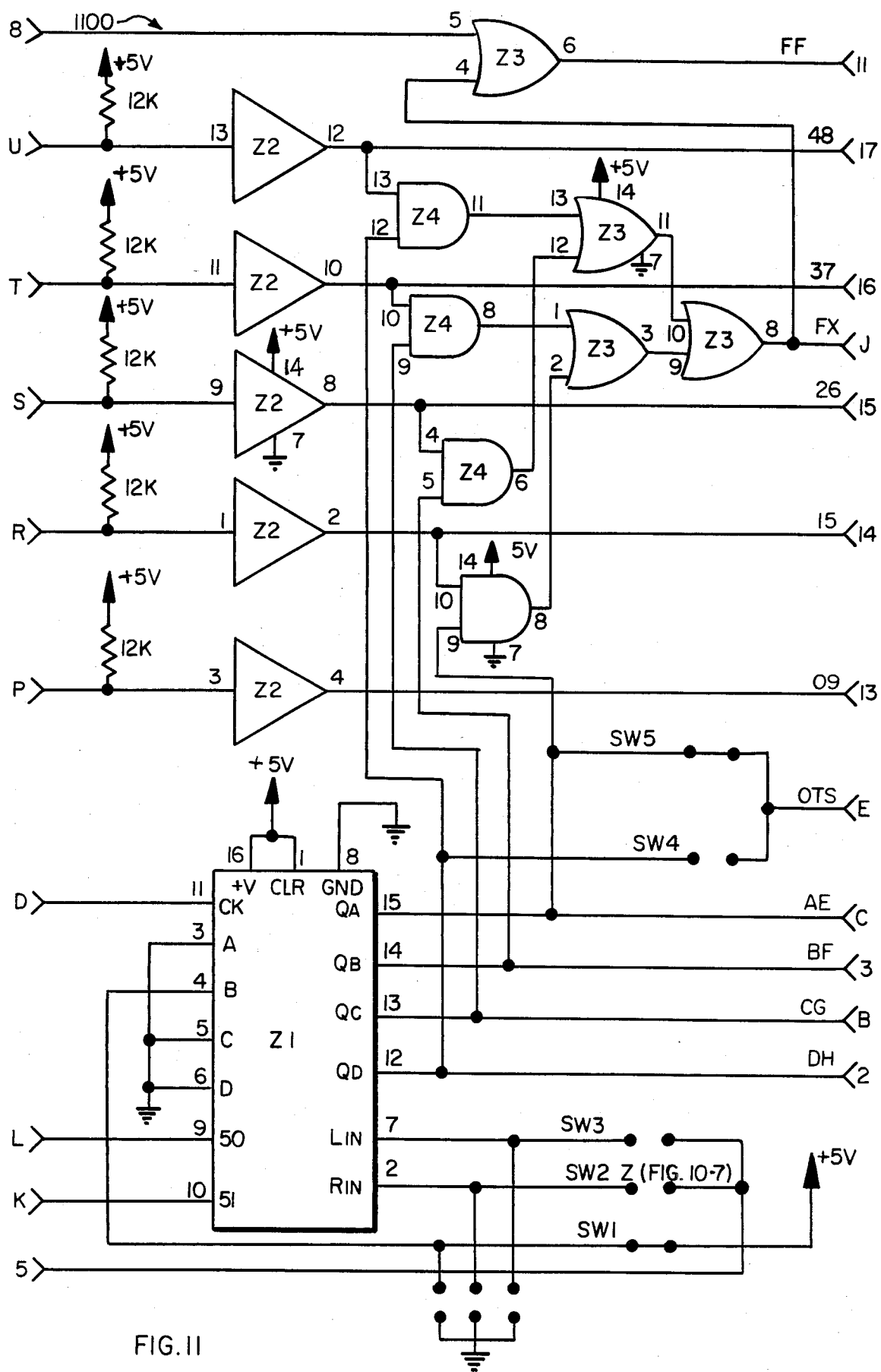
FIG. 11 is a circuit diagram of the shift high circuit element of the control system of FIG. 9.

The shift-high circuitry and the shift-low circuitry are shown in detail in FIGS. 10 and 11. The circuit elements and their connections for FIGS. 10 and 11 are shown in conventional schematic diagram nomenclature with the designation Z1 corresponding to 74194 4-bit bidirectional universal shift register integrated logic circuits, the designation Z2 corresponding to (a portion of) conventional 7407 hex buffer/driver integrated logic circuits, the designation Z3 corresponding to (at least a portion of) 7432 quadruple two input or gate integrated logic circuits and the designation Z4 corresponding to 7408 quadruple two input and gate integrated logic circuits (all integrated circuit types used herein are conventionally available from Texas Instruments, and many other integrated circuit suppliers). In FIGS. 10 and 11, apparatus interconnection designations are also shown as indicated, the high and low shift register boards 1000, 1100 control selection of the fine filling cycle activation weight which is chosen for the present logic state operation of the apparatus 10.

Figure 15:
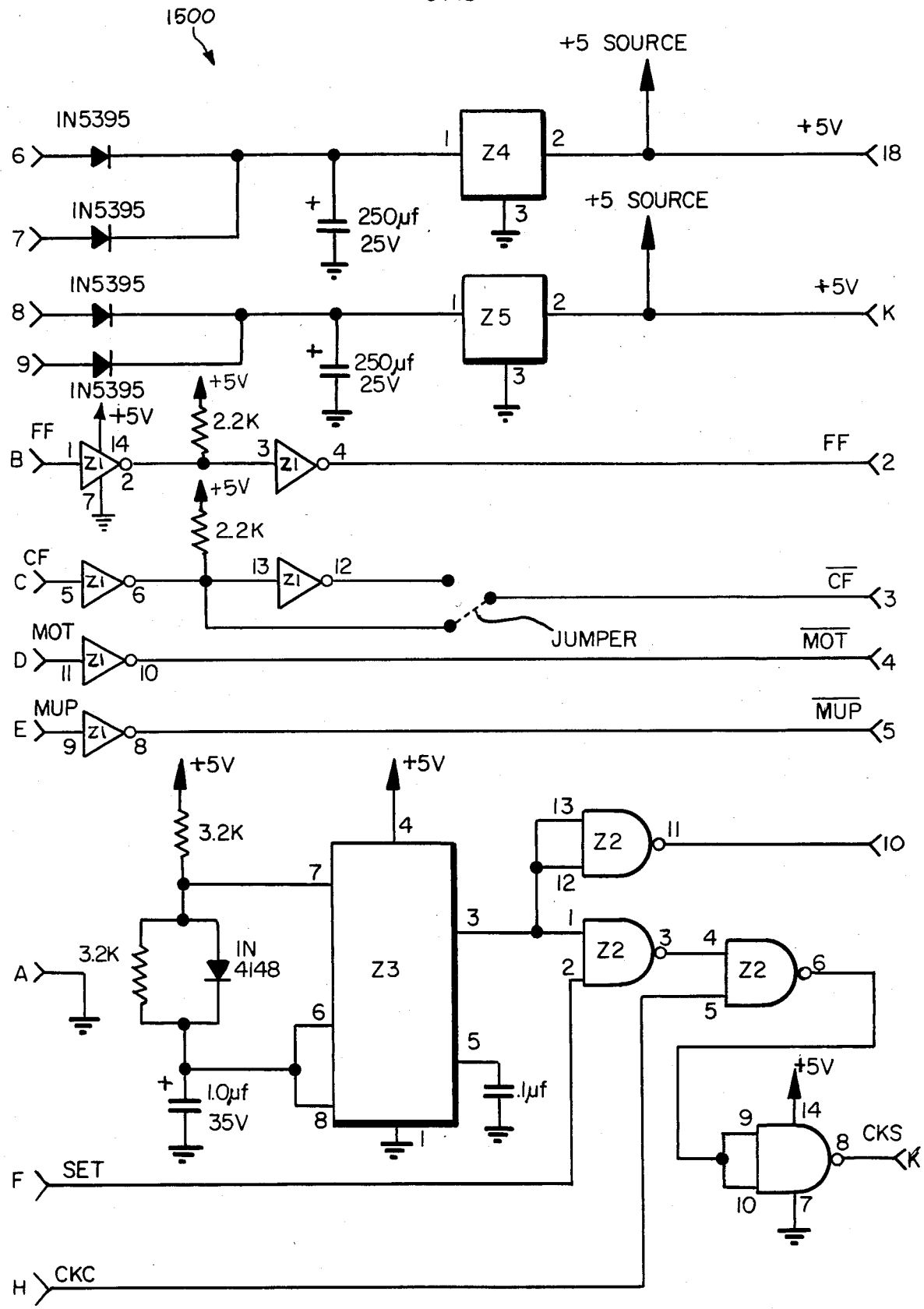
FIG. 15 is a circuit diagram of the power relay board circuitry of the control system of FIG. 9.
Figure 16:
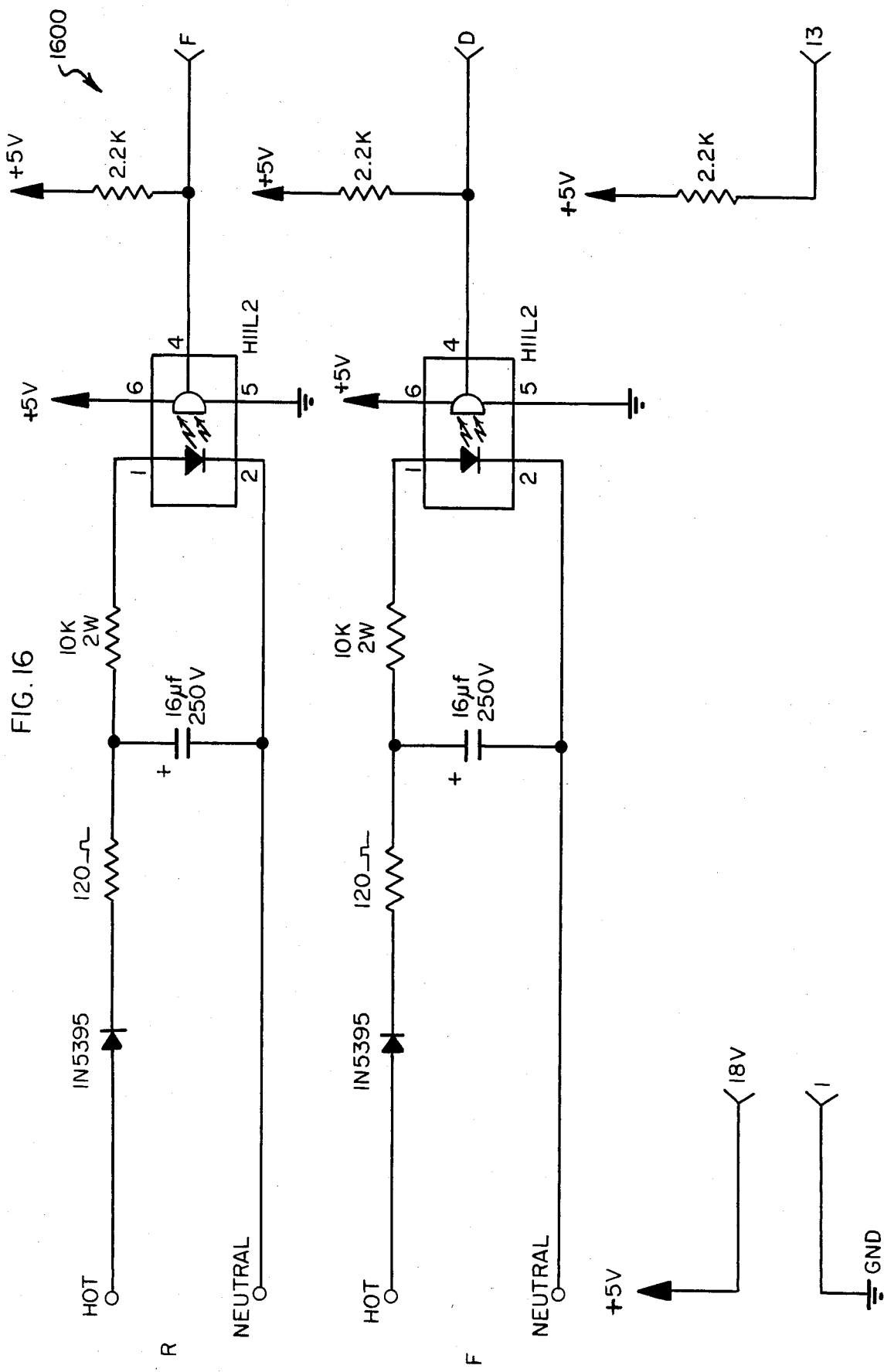
FIG. 16 is a circuit diagram of the interface circuitry of the proximity switches, converting 120 volt logic to five volt logic.
Figure 17A:
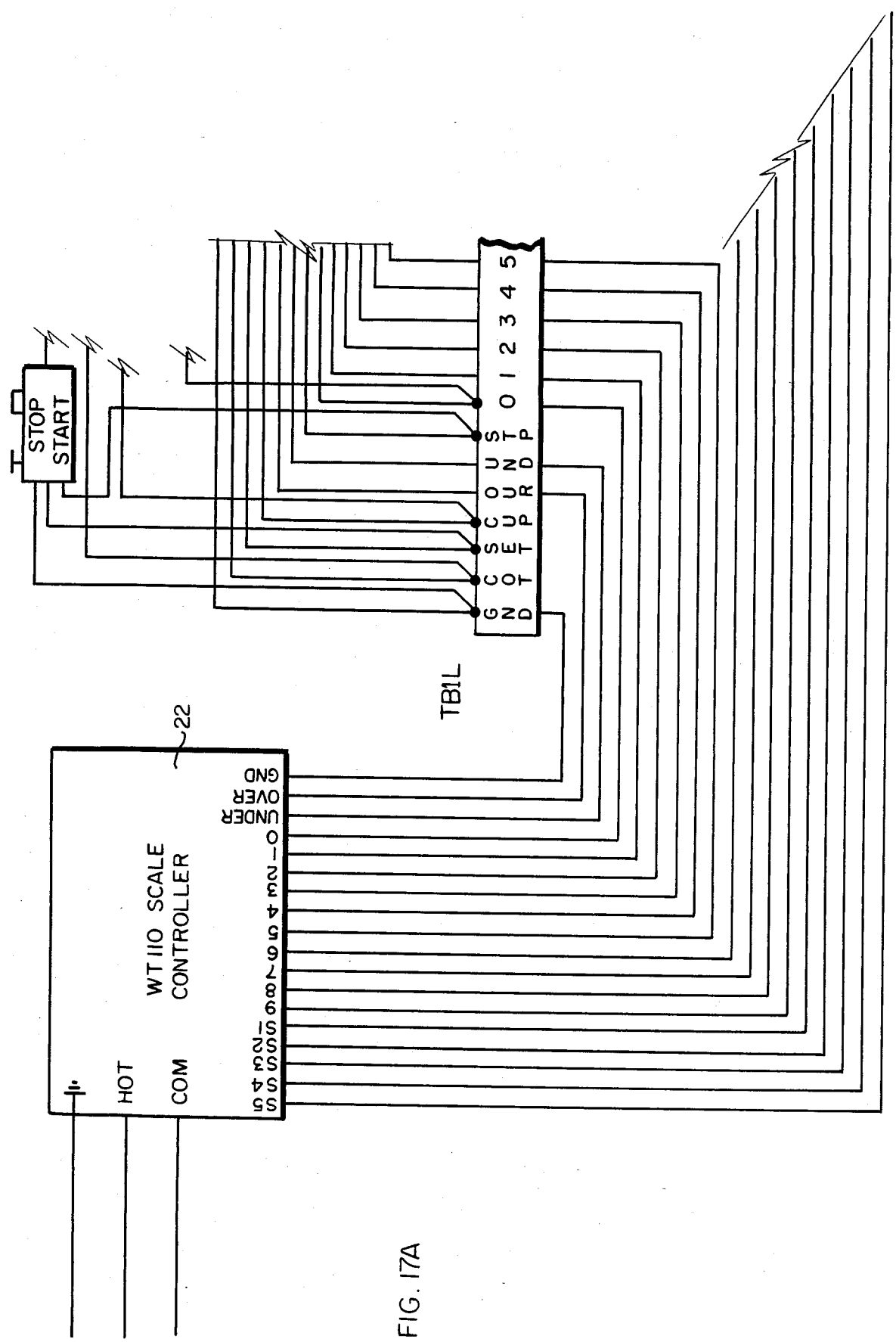

As shown in FIG. 10, the interface connections corresponding to the functional interconnections depicted in FIG. 9 are specifically labelled 8 (input from ground), U (input signal from scale controller 22 and cut-off signal 04 from FIG. 17), T (input signal from scale controller 22 and cut-off signal 03 from FIG. 17), S (input signal from scale controller 22 and cut-off signal 02 from FIG. 17), R (input signal from scale controller 22 and cut-off signal 01 from FIG. 17), P (input signal from scale controller 22 and cut-off signal 00 from FIG. 17), D (input from FIG. 15-K), L (input from FIG. 14-K), K (input from FIG. 14-J) and 5 (+5 v from FIGS. 15-18). The output connections shown in FIG. 10 corresponding to the functional interconnections depicted in FIG. 9 are labelled 11 (output to FIG. 11-8), 17 (output to display LED 4), 16 (output to display LED 3), J (output to FIG. 11-S), 15 (output to display LED 2), 14 (output to display LED 1), 13 (output to FIG. 12-P), E (output to FIG. 11-Z), C (output to display LED A), 3 (output to display LED B), B (output to display LED C), and 2 (output to display LED D).

As shown in FIG. 11, the interface input connections corresponding to the functional interconnections depicted in FIG. 9 are labelled 8 (input from FIG. 10-J), U (input signal from scale controller 22 and cut-off 08), T (input signal from scale controller 22 and cut-off 07), S (input signal from scale controller 22 and cut-off 06), R (input signal from scale controller 22 and cut-off 05), P (input signal from scale controller 22 and cut-off 09), D (input from FIG. 15-K), L (input from FIG. 14K), K (input from FIG. 14-J), 5 (+5 v from FIGS. 15-18). The output connections shown in FIG. 11 corresponding to the functional interconnections depicted in FIG. 9 are labelled 11 (output to FIG. 12-L), 17 (output to display LED 8), 16 (output to display LED 7), J (no connection), 15 (output to display LED 6), 14 (output to display LED 5), 13 (output to display LED - STOP and FIG. 13-J), E (output to FIG. 10-Z), C output to display LED E), 3 (output to display LED F), B (output to display LED G), 2 (output to display LED H).

Figure 12:
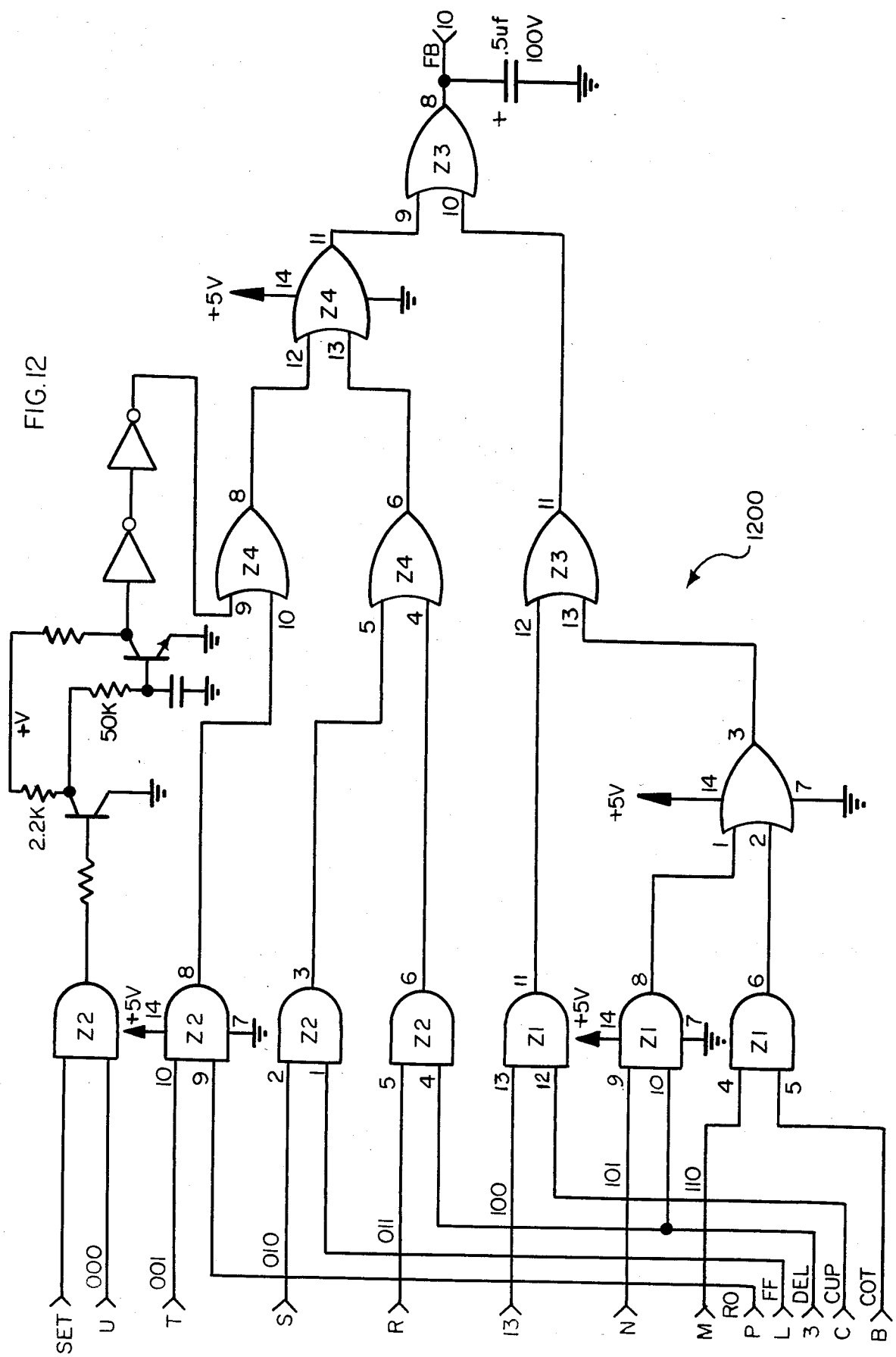
FIG. 12 is a circuit diagram of the function board circuitry of the control system of FIG. 9.

The function board circuitry 1200 is illustrated in FIG. 12. The illustrated circuitry receives input signals from the control board, as indicated to determine the current logic state of the sequence board 1300. In the circuit diagram of FIG. 12, the designations Z1 and Z2 correspond to 7408 logic circuit elements and the designations Z3 and Z4 correspond to 7432 logic circuit elements. As shown in FIG. 12, the interface input connections corresponding to the functional interconnections depicted in FIG. 9 are labelled U (input from FIG. 13-U), T (input signal from FIG. 13-T), S (input signal from FIG. 13-S), R (input signal from FIG. 13-R), 13 (input signal from FIG. 13-P), N (input signal from FIG. 13-N), M (input from FIG. 13-M), P (input from FIGS. 10-13), L (input from FIG. 11—11), 3 (input from FIG. 14-C), C and B (inputs from FIG. 17). The output connection shown in FIG. 12 corresponding to the functional interconnection depicted in FIG. 9 is labelled 10 (output to FIG. 13-L).

Figure 13:
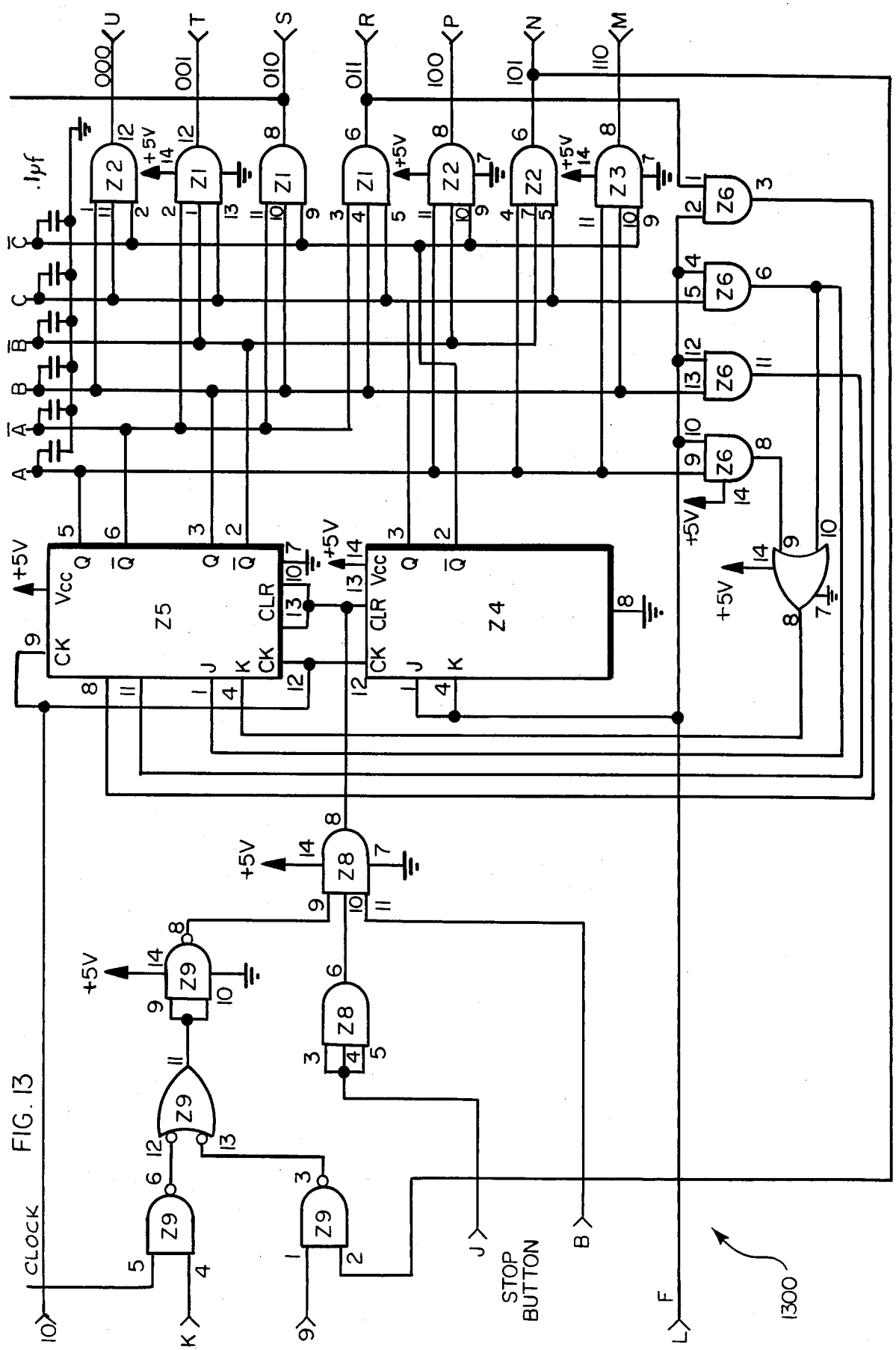
FIG. 13 is a circuit diagram of the sequence controller circuitry of the control system of FIG. 9.

Sequence board circuitry which carries out the logic process map of FIGS. 6, 7 and 8, is illustated in FIG. 13. In the circuit diagram of FIG. 13, the device designations Z1, Z2, Z3 and Z8 correspond to 7411 triple three input and gate integrated circuit components, the device designations Z4 and Z5 correspond to 74107 dual JK master-slave flip-flop with clear integrated circuit components, the designation Z6 corresponds to a 7408 integrated circuit device, the designation Z7 corresponds to a 7432 integrated circuit device and the designation Z9 corresponds to a 7400 integrated circuit device, in accordnce with conventional circuit device nomenclature. As shown in FIG. 13, the interface input connections corresponding to the functional interconnections depicted in FIG. 9 are labelled 10 (input from FIG. 15-10) (input from FIG. 16-E), 9 (input from FIG. 16-D), J (input from FIG. 11-13), B (input from FIG. 17), L (input from FIG. 12-L). The output connections shown in FIG. 13 corresponding to the functional interconnections depicted in FIG. 9 are labelled U (output to display LED, FIG. 12-U and FIG. 17), T (output to FIG. 12-T and FIG. 14-T), S output to FIG. 12-S and FIG. 14-S), R (output to FIG. 12-R and FIG. 14-R), P (output to FIG. 12-P, FIG. 14-P and FIG. 15-D), N (output to FIG. 12-N, FIG. 14-N and the display LED), M (output to FIG. 12-M, FIG. 14-M, Display LED and FIG. 15-E).

Figure 14:
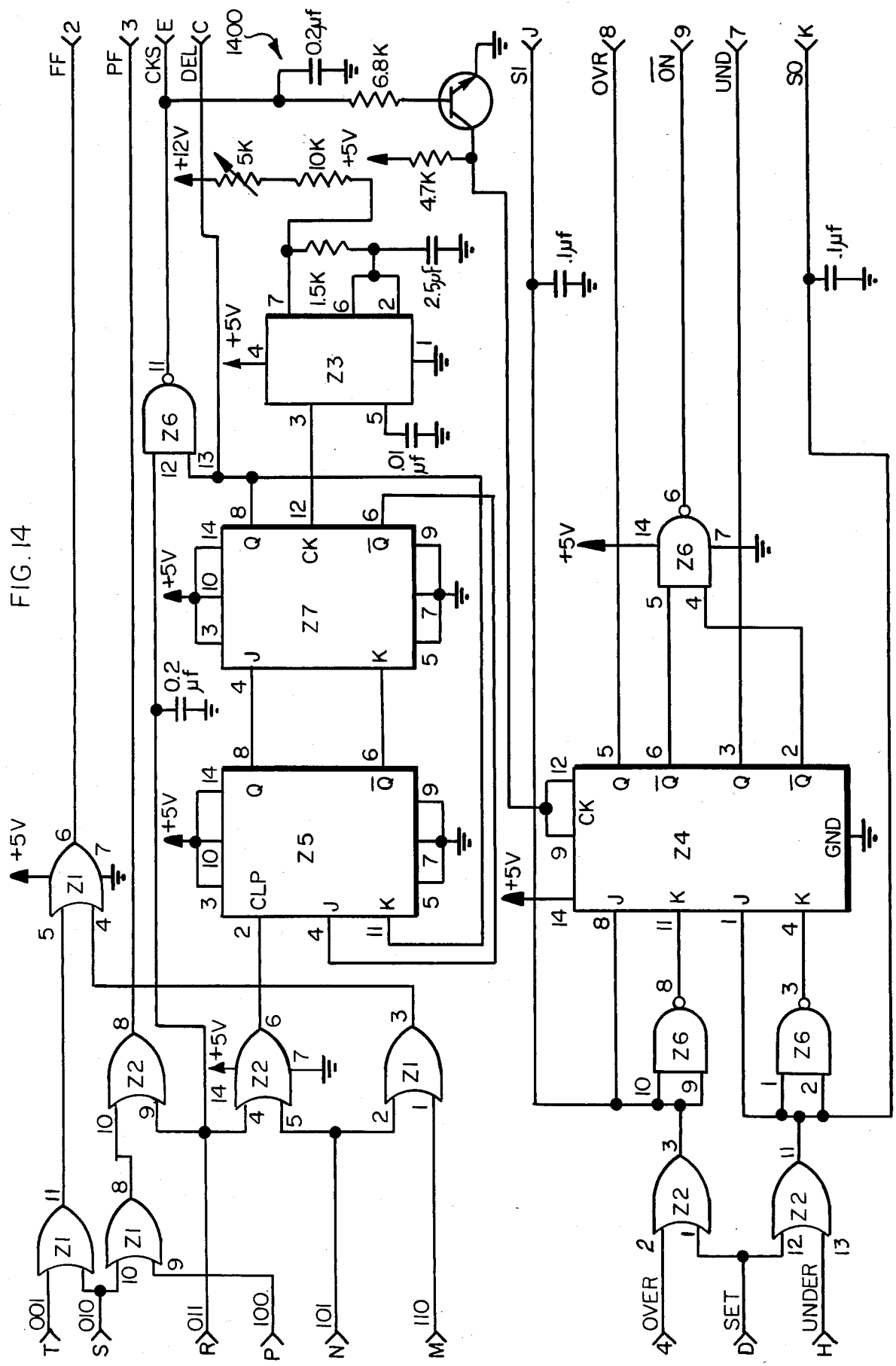
FIG. 14 is a circuit diagram of the control unit circuitry of the control system of FIG. 9.

The control board circuitry 1400 is shown in FIG. 14. As shown in FIG. 14, the device designations Z1 and Z2 correspond to 7432 integrated circuit device components, designation Z3 corresponds to a 555 timer integrated circuit device, and designation Z4 corresponds to a 74107 logic device. Also in FIG. 14, the designations Z5 and Z7 are 7407 integrated logic circuits and designation Z6 is a 7400 quadruple two input nand gate logic component. As shown in FIG. 14, the interface input connections corresponding to the functional interconnections depicted in FIG. 9 are designated T, S, R, P, N and M (inputs from FIG. 13), 4 (the "over" signal from scale controller 22—FIG. 17), D (input from FIG. 17), H (the "under" signal from scale controller 22—

FIG. 17). The output connections shown in FIG. 14 corresponding to the functional interconnections depicted in FIG. 9 are labelled 2 (outputs to FIG. 15-B and display LED), 3 (output to SSR, FIG. 15-C and display LED), E (output to FIG. 15-H), C (output to FIG. 12-3), J (output to FIGS. 10-K and 11-K), 8, 9 and 7 (outputs to display LED), K (output to FIG. 10-L and FIG. 11-L).

The power relay board circuits 1500 are shown in FIG. 15. As shown in FIG. 15, the device designation Z1 are 7405 hex inverter with open collector output logic elements. Device designations Z2 are 7400 logic elements. Device designation Z3 is 555 integrated circuit component and device designations Z4 and Z5 are 7805 power regulator integrated circuits. As shown in FIG. 15, the interface input connections corresponding to the functional interconnections depicted in FIG. 9 are labelled 6, 7, 8 and 9 (input from 12 VCT transformer output), B (input from FIG. 14-2), C (input from FIG. 14-3), D (input from FIG. 13-P), E (input from FIG. 13-N), A (signal common ground), F (input from FIG. 17), and H (input from FIG. 14-E). The output connections shown in FIG. 15 corresponding to the functional interconnections depicted in FIG. 9 are labelled 18 (output to logic +5), V (output to display drive V+), 2 (output to SSR), 3 (output to display LED), 4 (output to SSR), 5 (output to SSR), 10 (output to FIG. 13-10), K (output to FIG. 10-D and FIG. 11-D).

Similarly shown in FIG. 16 is a circuit diagram of interface circuitry 1600 for communication with the scale controller 22 and various pneumatic mechanisms including the ram carton drive mechanisms. As shown in FIG. 16, the interface input connections corresponding to the functional interconnections depicted in FIG. 9 are labelled R (input from rear proximity switch 120 VAC), F (input from front proximity switch 120 VAC), +5 v and GND (power supply connection). The output connections shown in FIG. 16 corresponding to the functional interconnections depicted in FIG. 9 are labelled F (output to FIG. 13-K) and D (output to FIG. 13-D).

The circuitry of FIG. 17 generally comprises the 5 volt logic circuitry for the apparatus 10, including the 5 volt logic control portion of the control box logic of FIG. 9, the logic circuitry of the scale controller 22 and the load cell signal interconnections of the scale 170. As shown in FIG. 17, the logic signals interact between the different components to effect the process steps as previously described. As shown, the weight information is transmitted from the scale head 170 to the scale processing unit 22 (Signals S1–S5), which transmits logic "cut-off" values 0 through 9, "over" and "under", based on measured weight values to the control box 26. The control box 26 physically contains the circuitry of FIG. 9. The scale system 22, 170 connections are also shown in FIG. 17. In this regard, the system 22, 170 consists of a Weigh-Tronix WI 110 weight indicator manufactured by Weigh-Tronix Company, Fairmont, Minn., which has the capability of storing a plurality of cut-off weight values, which are used to cause actuation of process steps as previously described. The scale 170 is capable of storing 10 digital preset target weights and outputing the target weights through a corresponding plurality of respective open collector transistors. The output consists of 12 logic lines which are either logic state 0 or logic state 1. They correspond to the 10 target cut-off values 0-9 which may be keyed in on the face of the unit, for weight values between 0 and 50 pounds, and two target weights "over" and "under". In the illustrated embodiment 10, the weight values utilized, and the corresponding logic signal utilized by the circuitry of FIG. 9, may be as follows:

| Cut-Off Logic Signal | Cream Cheese Weight |
|---|---|
| 00 | 27.5* |
| 01 | 29.4** |
| 02 | 29.45** |
| 03 | 29.50** |
| 04 | 29.55** |
| 05 | 29.60** |
| 06 | 29.65** |
| 07 | 29.70** |
| 08 | 29.9** |
| 09 | 30.5*** |
| Over | 29.95**** |
| Under | 30.05***** |

*coarse filling cycle activation weight
**selectable fine filling cycle activation weight
***equipment shutdown - State 000
****lower weight limit of target window
*****upper weight limit of target window Each logic line provides a logic 1 until the respective cut-off weight is reached and then provides a logic 0. As indicated, the other inputs to the scale processing unit 22 are the load cell signals which transmit an analog signal representative of the weight on the scale head 170.

Figure 18A:
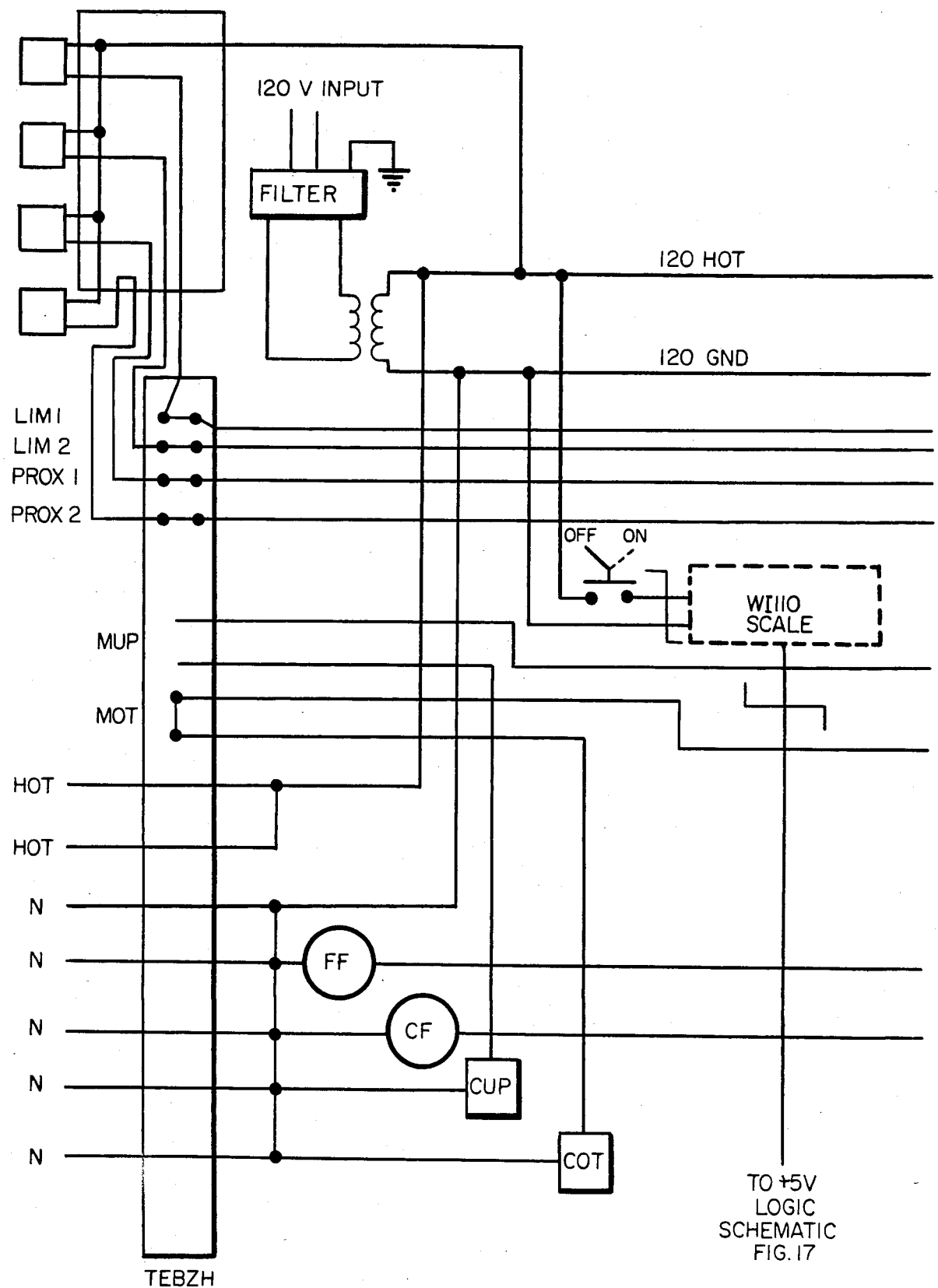
FIGS. 18A and 18B are a circuit diagram joined at the right side of FIG. 18A and the left side of FIG. 18B of the 120 volt connections between solid state relays, pneumatic valve relays, proximity switches and power supplies of the apparatus of FIG. 1.
Figure 18B:
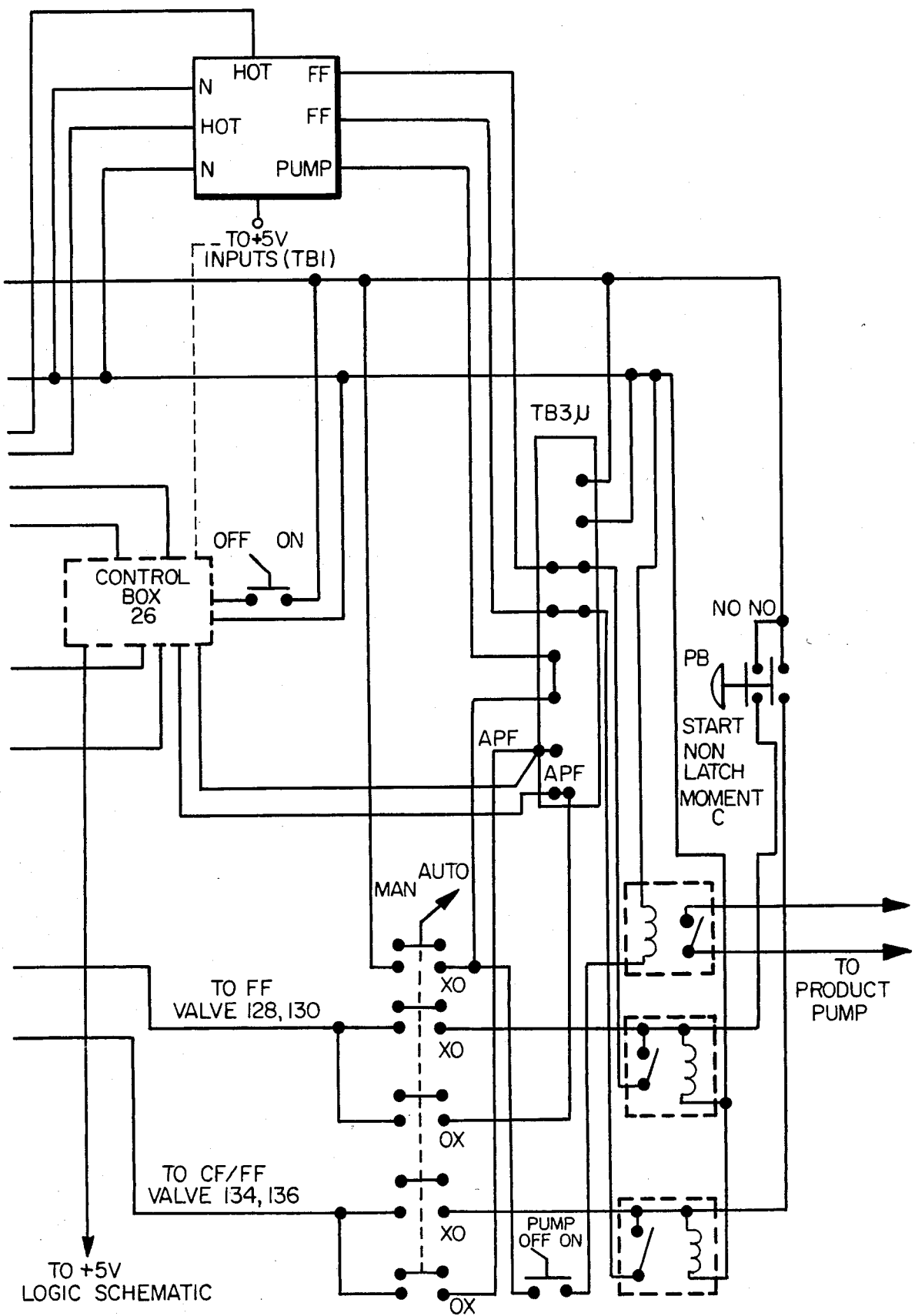

FIG. 18 is a circuit diagram of the 120 volt connections between the solid state relays, pneumatic valve relays, proximity switches and power supplies of the apparatus of FIG. 1. As shown in this diagram, 120 volt power is distributed to the scale and control boxes. Solid state relay connections control the appropriate pneumatic solenoids, and 120 volt relays in the proximity switches.

In operation, the circuitry illustrated in FIGS. 10–18 directs the operation of the apparatus generally shown in FIGS. 1–5 in the reliable and accurate packaging of cream cheese. During operation, moreover, the fine filling cut-off actuation weight value which is used in the current status of the apparatus 10 is displayed by the display unit 24 so that the operation of the system may be continuously monitored. In operation, the apparatus 10 provides automated, accurate filling operation in a reliable and consistent manner, under variable plant conditions which otherwise could adversely affect filling accuracy.

It will be appreciated that although the present invention has been described with respect to a specific, preferred embodiment, that various modifications and adaptations may be made based on the present specification without departing from the spirit and scope of the present disclosure.

What is claimed is:

1. A method for rapidly and accurately filling product containers with a predetermined weight of a viscous, fluid food product comprising the steps of providing a product supply stream of a viscous food product at a substantially constant product flow rate, sequentially advancing a plurality of product containers from a prefilling zone to a final filling and weighing zone, substantially continuously weighing each of said plurality of containers upon being positioned at the final filling and weighing zone, introducing substantially all of the product stream into each container positioned at the final filling and weighing station until the container reaches a coarse filling cycle activation weight, introducing a portion of said product stream into each container initially having at least said coarse filling cycle activation weight positioned at the final filling and weighing station at a rate which is substantially less than said substantially constant product flow rate at which the viscous food product is provided, while introducing at least a portion of the product stream into each one of said plurality of containers upon being positioned in the prefilling zone to partially fill the container at said prefilling zone, substantially continuously comparing the weight of each of said plurality of containers positioned at said final filling and weighing station, while introducing a portion of said product stream, to a predetermined fine filling cycle activation weight and terminating the introduction of food product into the product container positioned at the fine filling and weighing zone when the weight of the container reaches the predetermined fine filling cycle activation weight, weighing the container and comparing the weighed container weight to a predetermined weight range, reducing the fine filling cycle activation weight if the container weight exceeds said predetermined weight range and increasing said fine filling cycle activation weight if the container weight exceeds said predetermined weight range.

2. A method in accordance with claim 1 wherein said viscous food product is cream cheese, wherein said containers have a product weight capacity of at least about 10 pounds, wherein two containers of said plurality of containers are respectively substantially simultaneously advanced from an intermediate zone to said final filling and weighing zone and from said final filling and weighing zone to a filled container discharge zone, and wherein two containers of said plurality of containers are respectively alternately therewith substantially simultaneously advanced from said prefilling zone to said intermediate zone, and from a storage zone to the prefilling zone.

3. A method in accordance with claim 1 wherein said product supply stream has a supply rate of at least about two pounds of viscous food product per second, and wherein said portion of said product stream introduced at said fine filling zone has an introduction rate of less than 40% of said product supply stream rate.

4. A method for accurately filling containers with a viscous food product comprising the steps of periodically substantially simultaneously advancing a sequential plurality of product containers from a storage zone to a prefilling zone, and from the prefilling zone to an intermediate zone, partially filling each product container at the prefilling zone with a viscous food product, alternately with said periodic simultaneous advancement of product containers through said storage and prefilling zones, substantially simultaneously advancing the sequential plurality of product containers from the intermediate zone to a final filling and weighing zone, and from the final filling and weighing zone to a filled container discharge zone, and filling each of said containers to a predetermined weight level at said final filling and weighing zone.

5. Apparatus for rapidly and accurately filling product containers within a predetermined weight of a viscous, fluid food product comprising pumping means for providing a continuous stream of viscous food product to be packaged, prefilling station means for receiving a product container to be filled with a predetermined weight of the viscous food product, final filling station means for receiving a product container which has been partially filled at the prefilling station means, weighing controller means for substantially continuously weighing a product container received at the final container filling station means and for comparing the measured weight of the container with a predetermined cycle activation weight, and for providing a signal indicative of the measured weight of the product container at the final product filling station means corresponding to the predetermined cycle activation weight cycle, fine filling cycle activation weight adjustment means for comparing the measured weight of the product container with a desired finished product weight range, and for decreasing the fine filling cycle activation weight if the measured filled product container is above the desired final product weight range, and increasing the fine filling cycle activation weight if the measured filled product container weight is below the desired food product weight range, prefill discharge means for introducing viscous food product into a product container received at the prefilling station means, compound filling means for introducing viscous food product selectively at a first coarse filling flow rate and at a second fine filling flow rate which is less than the coarse filling flow rate into a product container received at the final filling station means, valve means for directing the continuous stream of viscous food product from the pumping means to at least one of the prefilling discharge nozzle means or the compound filling discharge means, and valve means for controlling the flow through the coarse discharge nozzle means and the fine filling discharge nozzle in response to the weighing controller means, and container transport means for sequentially advancing a plurality of containers to the prefilling station means, and from the prefilling station to the final filling station means.

6. Apparatus for filling containers comprising a storage station means for storing empty containers, and prefilling station means for partially filling a container received from said storage station means, intermediate station means for temporarily storing a partially filled container received from said prefilling station means, final filling station means for filling a partially filled container received from said intermediate station means to a predetermined weight level, first dual container ram means for simultaneously advancing a sequential plurality of containers from said storage station means to said prefilling station means, and from said prefilling station means to said intermediate station means, second dual container ram means for, alternately with said first dual container ram means, substantially simultaneously advancing a sequential plurality of containers from said intermediate station means to said final filling means, and from the final filling means to discharge the container.

7. A method in accordance with claim 1 wherein said containers are selected from the group consisting of plastic lined bulk product cartons or bulk product barrels and valved specific packaging containers.

8. A method in accordance with claim 2 wherein said containers are selected from the group consisting of plastic lined bulk product cartons or bulk product barrels and valved specific packaging containers.

9. A method in accordance with claim 3 wherein said containers are selected from the group consisting of plastic lined bulk product cartons or bulk product barrels and valved aseptic packaging containers.

10. A method in accordance with claim 1 wherein from about 40 to about 60 percent of the total product weight in the filled carton is introduced into each container in the prefilling zone.

11. A method in accordance with claim 2 wherein from about 40 to about 60 percent of the total product weight in the filled carton is introduced into each container in the prefilling zone.

12. A method in accordance with claim 3 wherein from about 40 to about 60 percent of the total product weight in the filled carton is introduced into each container in the prefilling zone.

13. A method in accordance with claim 1 wherein one of said sequential product containers is advanced from said prefilling station and a subsequent one of said product containers is advanced to said prefilling station while substantially all of said product stream is being introduced into one of said plurality of containers positioned at said final filling and weighing station.

14. A method in accordance with claim 2 wherein one of said sequential product containers is advanced from said prefilling station and a subsequent one of said product containers is advanced to said prefilling station while substantially all of said product stream is being introduced into one of said plurality of containers positioned at said final filling and weighing station.

15. A method in accordance with claim 3 wherein one of said sequential product containers is advanced from said prefilling station and a subsequent one of said product containers is advanced to said prefilling station while substantially all of said product stream is being introduced into one of said plurality of containers positioned at said final filling and weighing station.

16. A method in accordance with claim 2 wherein substantially all of said product supply stream is introduced into each one of said plurality of containers positioned at said prefilling zone while said two containers of said plurality of containers are substantially simultaneously advanced respectively from said intermediate zone to said final filling and weighing zone and from said final filling and weighing zone to said filled container discharge zone.

* * * * *